US012489240B2

(12) United States Patent
Huber et al.

(10) Patent No.: US 12,489,240 B2
(45) Date of Patent: Dec. 2, 2025

(54) SMALL PITCH CONTACT ASSEMBLY WITH INTEGRATED GUIDE ELEMENT

(71) Applicant: Rosenberger Hochfrequenztechnik Gmbh & Co. KG, Fridolfing (DE)

(72) Inventors: Ludwig Huber, Fridolfing (DE); Michael Sommerauer, Teisendorf (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 381 days.

(21) Appl. No.: 18/138,168

(22) Filed: Apr. 24, 2023

(65) Prior Publication Data

US 2024/0356267 A1 Oct. 24, 2024

(51) Int. Cl.
*H01R 13/504* (2006.01)

(52) U.S. Cl.
CPC .................................. *H01R 13/504* (2013.01)

(58) Field of Classification Search
CPC .................. H01R 13/504; H01R 13/03; H01R 13/65915; H01R 12/714; H01R 12/75; H01R 12/7011; H01R 43/16
USPC .......................................................... 439/391
See application file for complete search history.

(56) References Cited

U.S. PATENT DOCUMENTS

| | | | | |
|---|---|---|---|---|
| 11,289,838 | B2 * | 3/2022 | Ashibu | H01R 12/57 |
| 2012/0270446 | A1 * | 10/2012 | Shibata | H01R 12/716 439/629 |
| 2014/0004752 | A1 * | 1/2014 | Sagayama | H01R 12/89 439/670 |
| 2015/0162679 | A1 * | 6/2015 | Komoto | H01R 12/714 439/670 |
| 2015/0171532 | A1 * | 6/2015 | Komoto | H01R 13/2442 439/670 |
| 2017/0133797 | A1 * | 5/2017 | Guo | H01R 13/6585 |
| 2019/0115678 | A1 * | 4/2019 | Zhao | H01R 13/6471 |
| 2021/0194164 | A1 | 6/2021 | Epitaux et al. | |
| 2021/0376505 | A1 | 12/2021 | Sherman et al. | |

FOREIGN PATENT DOCUMENTS

| | | | |
|---|---|---|---|
| GB | 2491591 A * | 12/2012 | H01R 12/57 |

* cited by examiner

*Primary Examiner* — Peter G Leigh
(74) *Attorney, Agent, or Firm* — David P. Dickerson

(57) ABSTRACT

An assembly comprising a first plurality of contacts and at least one guide, wherein the at least one guide and each contact of the first plurality of contacts comprises a portion belonging to a common layer of metal, and each contact of the first plurality of contacts is rigidly affixed to the at least one guide.

19 Claims, 10 Drawing Sheets

SMALL PITCH CONTACT ASSEMBLY WITH INTEGRATED GUIDE ELEMENT

BACKGROUND OF THE DISCLOSURE

Field of the Disclosure

The present disclosure relates to an assembly, in particular to a contact assembly for use in an electrical connector or probe. The present disclosure furthermore relates to an analogous method, in particular to a manufacturing of a plurality of contacts and at least one guide for use in an electrical connector or probe.

Description of the Related Art

It is known provide an electrical connector with contacts. The present disclosure expounds upon this background.

SUMMARY OF THE PRESENT DISCLOSURE

The aim of the present summary is to facilitate understanding of the present disclosure. The summary thus presents concepts and features of the present disclosure in a more simplified form and in looser terms than the detailed description below and should not be taken as limiting other portions of the present disclosure.

Loosely speaking, the present disclosure teaches an assembly comprising a plurality of contacts and at least one guide. By manufacturing the contacts and guide(s) in concert from a single layer of metal or from a plurality of layers including a metallic layer, a very high degree of positional accuracy can be achieved between the contacts and the guide(s). This, in turn, allows the positional accuracy between the contacts and a receiving device that includes guide-receiving elements to be correspondingly improved.

Other objects, advantages and embodiments of the present disclosure will become apparent from the detailed description below, especially when considered in conjunction with the accompanying drawings.

DETAILED DESCRIPTION

Figure 1:
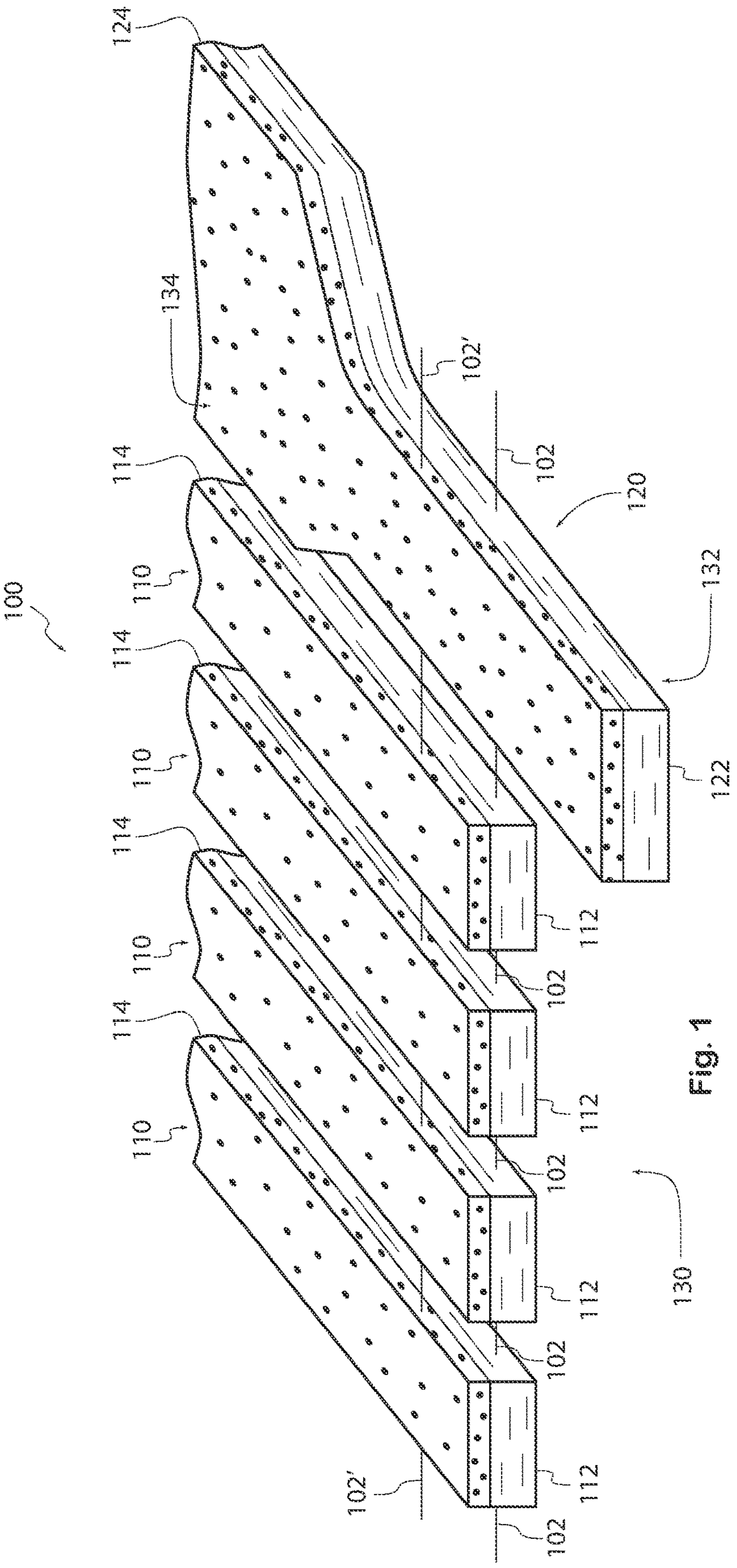
FIG. 1 shows details of a first embodiment of an assembly in accordance with the present disclosure.

The various embodiments of the present disclosure and of the claimed invention, in terms of both structure and operation, will be best understood from the following detailed description, especially when considered in conjunction with the accompanying drawings.

Before elucidating the embodiments shown in the Figures, the various embodiments of the present disclosure will first be described in general terms.

The present disclosure teaches an assembly. The assembly may be contact assembly, e.g. a contact assembly for use in an electrical connector or probe. Similarly, the assembly may constitute (part of) an electrical connector or probe.

The assembly may comprise a (first) contact. The assembly may comprise a second contact. Similarly, the assembly may comprise a (first) plurality of contacts. For example, the assembly may comprise at least 10, at least 20, or at least 40 contacts. Similarly, the assembly may comprise not more than 100, not more than 50, or not more than one contact. Hereinafter, the term "the contact" will be used to designate the first contact and/or the second contact and/or any of the (first) plurality of contacts. (An elucidation of the term "any" is given in the closing paragraphs of this specification.)

The contact may be electrically conductive. As such, the contact may be termed an electrical contact. The contact may consist of at least one metallic material. The metallic material may be a metal or a metal alloy. The contact may exhibit a volume resistivity of less than $10^5$ Ω·cm. For example, the contact may exhibit an electrical conductivity greater than lead. More specifically, an electrical conductivity at 20° C. between any two points belonging to the contact may be greater than an electrical conductivity at 20° C. between two corresponding points of a lead component having a shape identical to the contact.

The assembly may comprise at least one guide, e.g. a plurality of guides. Hereinafter, the term "the guide" will be used to designate any of the at least one guide. Any individual guide may comprise a respective individual one contact of the (first) plurality of contacts. Any individual guide and any individual contact of the (first) plurality of contacts may be constituted as an unitary element. Such a unitary element—as a whole—may, but need not, exhibit characteristics of a guide/contact as described in the present disclosure. Such a unitary element may be (imaginarily) divisible into two sub-elements, one of which exhibits characteristics of a guide as described in the present disclosure and the other of which exhibits characteristics of a contact as described in the present disclosure. Such a unitary element—as a whole—may be excluded from the set "each contact" and/or from the set "each guide".

The guide may be electrically conductive. The guide may consist of at least one metallic material. The metallic material may be a metal or a metal alloy. In particular, the guide may consist of the same at least one metallic material as the contact. The guide may exhibit a volume resistivity of less than $10^5$ Ω·cm. For example, the guide may exhibit an electrical conductivity greater than lead. More specifically, an electrical conductivity at 20° C. between any two points belonging to the guide may be greater than an electrical conductivity at 20° C. between two corresponding points of a lead component having a shape identical to the guide.

In the case of a probe, i.e. in the case of an assembly that constitutes (part of) a probe, the assembly may comprise not more than one contact and not more than two guides. For example, the assembly may comprise the first contact, a first guide and a second guide. Similarly, the assembly may comprise not more than two contacts and not more than two guides. For example, the assembly may comprise the first contact, the second contact, a first guide and a second guide. Furthermore, even in the case of a probe, the assembly may comprise at least one contact and at least one guide. For example, the assembly may comprise three, four, or five contacts, and a first guide. Similarly, the assembly may comprise three, four, or five contacts, a first guide, and a second guide. The three contacts may constitute two reference contacts and one signal contact in a GSG (ground, signal, ground) configuration. The four contacts may constitute two reference contacts and two signal contacts in a GSSG (ground, signal, signal, ground) configuration. The five contacts may constitute two reference contacts and three signal contacts in a GSSSG (ground, signal, signal, signal, ground) configuration. The reference contacts may electrically contact a reference conductor, e.g. as described below. Each individual signal contact may electrically contact a signal conductor, e.g. as described below. The (first/second) guide may be electrically insulated from the contact(s) and/or from any other electrically conductive components of the assembly.

The contact may be an elongate contact. A length of the contact may be at least 5 times, at least 10 times, or at least 15 times a width of the contact. The width of the contact may be at least 2 times, at least 5 times, or at least 10 times a thickness of the contact. Similarly, the width of the contact may be at least 0.25 times, at least 0.5 times, or at least 1.0 times a thickness of the contact (and less than 0.5 times, less than 1.0 times, less than 2 times, or less than 5 times a thickness of the contact. The length of the contact may be a length of a longest edge of a minimally sized, imaginary rectangular cuboid that encloses the contact. Similarly, the length of the contact may be a length of an edge of the imaginary rectangular cuboid, which edge is (most closely) parallel to a (primary) direction of signal propagation through the contact. Similarly, the length of the contact may be a length of an edge of the imaginary rectangular cuboid, which edge is (most closely) parallel to an imaginary line from a first portion of the contact that contacts, e.g. by welding or soldering, a conductor to a second portion of the contact most distal from the first portion. The thickness of the contact may be a length of a shortest edge of the imaginary rectangular cuboid. The thickness of the contact may be a length of an edge of the imaginary rectangular cuboid (closest to) perpendicular to a major surface of the guide. Similarly, the thickness of the contact may be a length of an edge of the imaginary rectangular cuboid (closest to) perpendicular to a plane that intersects each of the (first) plurality of contacts, e.g. a plane of a common layer (as described below). The width of the contact may be a length of an edge of the imaginary rectangular cuboid that is perpendicular to the edge that defines a length of the contact and perpendicular to the edge that defines the thickness. The contact may have a shape of a rectangular cuboid. The contact may have a shape that fills at least 80%, at least 90%, or at least 95% of the imaginary rectangular cuboid. The length of the contact may be less than 20 mm, less than 15 mm, less than 10 mm, less than 5 mm, or less than 2 mm. The width of the contact may be less than 1 mm, less than 0.5 mm, less than 0.2 mm, or less than 0.1 mm. The thickness of the contact may be less than 1 mm, less than 0.5 mm, less than 0.2 mm, or less than 0.1 mm. The teachings of this paragraph apply to the contact in an unbent state without being limited to an unbent state.

In the case of a probe, the contact may exhibit any of the characteristics described in the preceding paragraph. Similarly, the contact may have a tip width. The tip width may be a dimension of the contact at a (distal) tip of the contact in a direction perpendicular to (an edge that defines) a length of the contact and (an edge that defines) a thickness of the contact. The tip width may be less than 1 mm, less than 0.5 mm, less than 0.2 mm, or less than 0.1 mm. The tip width may be less than 1/10, less than 1/20, or less than 1/40 times the width of the contact. The contact may have a shape of a three-sided right prism. The contact may have a shape that fills at least 80%, at least 90%, or at least 95% of a minimally sized, imaginary three-sided right prism that encloses the contact.

The guide may be a plate-shaped guide. A length of the guide may be at least 2 times, at least 5 times, or at least 10 times a thickness of the guide. A width of the guide may be at least 2 times, at least 5 times, or at least 10 times a thickness of the guide. The thickness of the guide may be a length of a shortest edge of a minimally sized, imaginary rectangular cuboid that encloses the guide. The thickness of the guide may be a length of an edge of the imaginary rectangular cuboid (closest to) perpendicular to a major surface of the guide. Similarly, the thickness of the guide may be a length of an edge of the imaginary rectangular cuboid (closest to) perpendicular to a plane that intersects each of the (first) plurality of contacts, e.g. a plane of a common layer (as described below). The length of the guide may be a length of a longest edge of the imaginary rectangular cuboid enclosing the guide. Similarly, the length of the guide may be a length of an edge of the imaginary rectangular cuboid, which edge is (most closely) parallel to a (primary) direction of signal propagation through the contact. Similarly, the length of the guide may be a length of an edge of the imaginary rectangular cuboid, which edge is (most closely) parallel to an imaginary line from a first portion of the guide that contacts, e.g. by welding or soldering, a conductor to a second portion of the guide most distal from the first portion. The width of the guide may be a length of a third edge of the imaginary rectangular cuboid enclosing the guide, which third edge is perpendicular to the edge (of the imaginary rectangular cuboid enclosing the guide) that defines a length of the guide and perpendicular to the shortest edge (of the imaginary rectangular cuboid enclosing the guide). A minimum thickness of the guide measured in a direction parallel to the thickness of the guide may be at least 80%, at least 90%, or at least 95% of the thickness of the guide. The thickness of the guide may be less than 1 mm, less than 0.5 mm, less than 0.2 mm, or less than 0.1 mm. The teachings of this paragraph apply to the guide in an unbent state without being limited to an unbent state.

In the case of a probe, the guide may exhibit any of the characteristics described in the preceding paragraph. Similarly, the guide may have a tip width. The tip width may be a dimension of the guide at a (distal) tip of the guide in a direction perpendicular to (an edge that defines) a length of the guide and (an edge that defines) a thickness of the guide. The tip width may be less than 1 mm, less than 0.5 mm, less than 0.2 mm, or less than 0.1 mm. The tip width may be less than 1/10, less than 1/20, or less than 1/40 times the width of the guide. The guide may have an approximate shape of a three-sided right prism. The guide may have a shape that fills at least 70%, at least 80%, at least 90%, or at least 95% of a minimally sized, imaginary three-sided right prism that encloses the guide.

The thickness of the guide may match the thickness of the contact. The thickness of the guide may be greater than 80%, greater than 90%, or greater than 95% of the thickness of the contact. The thickness of the guide may be less than 120%, less than 110%, or less than 105% of the thickness of the contact. The length of the guide may match the length of the contact. The length of the guide may be greater than 80%, greater than 90%, or greater than 95% of the length of the contact. The length of the guide may be less than 120%, less than 110%, or less than 105% of the length of the contact. The width of the guide may be at least 4 times, at least 6 times, at least 8 times, or at least 10 times the width of the contact. The teachings of this paragraph apply to in an unbent state of the guide and contact without being limited to an unbent state.

The contact and the guide may comprise a portion belonging to a common layer of material. For example, for each contact individually and each guide individually, a portion of the respective contact/guide may belong to a common layer of material, e.g. to a layer of material that forms a portion of each contact and each guide. An entirety of the contact and the guide may belong to the common layer of material. The common layer of material may form an entirety of the contact and the guide. The common layer of material may be a layer of conductive material, e.g. a layer of metal. The contact and the guide may be of a first material, e.g. metal. The contact and the guide may be of a homogeneous material. The contact and the guide may be machined, e.g. by means of a subtractive machining process, from a single, continuous unit of (homogeneous) material. For example, the contact and the guide may be cut and/or stamped and/or etched from a single, continuous unit of (homogeneous) material. The single, continuous unit of (homogeneous) material may be a sheet of (homogeneous) material. The single, continuous unit of (homogeneous) material may be a (unitary) layer of (homogeneous) material, e.g. a (unitary) layer of a first (homogeneous) material provided on a substrate that differs from the first material. The contact and the guide may be manufactured, e.g. by an additive and/or subtractive manufacturing process or by a combination of additive and subtractive manufacturing processes, such that the contact and the guide are parts of a single (unitary) layer of (homogeneous) material. For example, an additive manufacturing process may be used to form the contact and the guide by depositing a material, e.g. metal, (exclusively) onto areas of a (substrate) surface, which areas correspond to a (n overall) shape of the contact and the guide. More specifically, an additive manufacturing process may be used to deposit a first material (exclusively) in each of a plurality of disjoint regions on a substrate (that differs from the first material). Each respective individual region may constitute a respective individual one contact/guide (after separation from the substrate). Alternatively, the plurality of disjoint regions may be processed by at least one other (additive and/or subtractive) process to form the contact and/or the guide. Similarly, an additive manufacturing process may be used to deposit a (homogeneous) layer of a first material onto a substrate (that differs from the first material). The contact and the guide may be machined, e.g. cut and/or stamped and/or etched, from the (homogeneous) layer of first material. While this paragraph speaks of "the contact and the guide" in the broad sense of "(the first contact AND/OR at least one of the (first) plurality of contacts) AND/OR at least one of the at least one guide", this paragraph applies, in particular, to "the contact and the guide" in the narrow sense of "the first contact AND each individual one of the at least one guide" OR "each individual one of the (first) plurality of contacts AND each individual one of the at least one guide".

As touched upon above, the assembly may comprise at least one layer of (respective) material. For simplicity, the at least one layer of material may be termed a "stack". The at least one layer of material may constitute a stack. Similarly, any of the at least one layer may be stacked. The stack may comprise (at least two) layered materials. For example, the assembly may comprise a stack of at least two different conductive materials or may comprise a stack of a non-conductive material and at least one conductive material. Thus, in the present disclosure, the term "stack" may be, but need not be, understood as comprising at least two layered materials. Any individual layer, e.g. each individual layer, of the stack may be (abuttingly) arranged on a (respective) other individual layer of stack, e.g. such that (an entirety of) a major surface of the (respective) individual layer is abuttingly adjacent (an entirety of) a major surface of the (respective) other layer. The material of any layer of the stack may be a conductive material, e.g. a metal or a metal alloy. The conductive material may exhibit a volume resistivity of less than $10^5$ Ω·cm. The stack may comprise at least one layer of a non-conductive material, e.g. a non-conductive material having an elastic modulus, in particular a Young's modulus, higher than copper. The non-conductive material may exhibit a volume resistivity greater than $10^9$ Ω·cm. The material of any individual layer may (macroscopically) differ from the material of each adjacent layer. For example, the material of any individual layer may exhibit a volume resistivity that differs by a factor of at least 1.2, at least 1.5, at least 2, or at least 5 from a volume resistivity of the material of at least one adjacent layer. Similarly, the material of any individual layer may exhibit a yield strength and/or an elastic modulus, e.g. a Young's modulus, that differs by a factor of at least 1.2, at least 1.5, at least 2, or at least 5 from a yield strength/elastic modulus of the material of at least one adjacent layer. For example, one layer may be of a highly conductive material, e.g. copper, and another (adjacent) layer may be of a conductive material exhibiting a high elastic modulus, e.g. tungsten carbide. The (respective) material of any individual layer may be (macroscopically) homogeneous. Any individual layer, e.g. each individual layer, of the stack may be a (macroscopically) planar layer of material. Similarly, any layer(s) of the stack may be arranged in (macroscopically) planar configuration. Any (individual) layer(s) of the stack may be (macroscopically) planar in the sense that an imaginary minimally-sized rectangular cuboid enclosing an entirety of the (respective) layer(s) has two major faces and four minor faces, a surface area of one major face being at least 10, at least 20, at least 50, or at least 100 times larger than a surface area of a largest minor face. Similarly, any (individual) layer(s) of the stack may be (macroscopically) planar in the sense that (at least 90% or at least 95% of) an overall volume of the material of the respective layer(s) may be represented by an imaginary set of parallel identical planar cross-sections (where "identical" may refer solely to the shape of the cross-sections without prejudice for other features of the cross-sections). The material of any (individual) layer(s) of the stack may be structured, e.g. as a result of processing—for example, as a result of an additive and/or subtractive manufacturing process or by a combination of additive and subtractive manufacturing processes—during manufacture of the assembly. For clarity, the term "stack" may refer to material(s) as ultimately shaped and configured, post-processing, in the finished assembly. The term "stack" may likewise refer to material(s) in shapes and/or configurations differing from the finished assembly. For example, the material(s) processed to obtain the stack may, e.g. at an outset of the processing or at an intermediate state during the processing, have the constitution and/or configuration of a stack as described above. For the sake of simplicity, the present disclosure uses the term "unfinished stack" to designate material(s) having the constitution and/or configuration of a stack as described above, but requiring additional processing to achieve the constitution and/or configuration of the stack in the finished assembly. The material of any (individual) layer(s) of the stack may be structured, e.g. by an additive and/or subtractive manufacturing process or by a combination of additive and subtractive manufacturing processes, into a plurality of disjointed units, e.g. such that each individual unit comprises a volume of each layer of the stack. For example, an unfinished stack may be processed, e.g. by a combination of additive and subtractive manufacturing processes, into a plurality of disjointed units such that each individual unit comprises a volume of each layer of the (unfinished) stack. The plurality of disjointed units may define the aforementioned identical cross-sections. For example, a respective outline of each unit individually may collectively define the aforementioned identical cross-sections. The teachings of this paragraph apply to the at least one layer in an unbent state without being limited to an unbent state.

As noted above, the contact and the guide may comprise a portion belonging to a common layer of material. The common layer of material may be a layer of material belonging to a stack of layered materials. Similarly, the common layer of material may be a (single) layer of material that constitutes a stack. An entirety of the contact and the guide may belong to the stack, i.e. to the at least one layer of material (that comprises a common layer of material, e.g. a layer of metal). The stack may constitute the contact and the guide. For example, the contact and the guide, collectively, may consist of (an entirety of) the stack. Each contact individually and each guide individually may comprise or consist of a (respective) volume the stack. The plurality of disjointed units may constitute the contact and the guide. For example, each unit individually of the plurality of disjointed units may constitute an individual contact or an individual guide. The contact and guide may be structured such that, for any point belonging to a partial volume of the contact and guide, which partial volume may constitute at least 90% or at least 95% of an overall volume of the material constituting the contact and guide, an imaginary plane exists that intersects each contact and each guide of the contact and guide. Each such imaginary plane may belong to a set of parallel imaginary planes. An entire volume of material belonging to an intersection of the imaginary plane with the contact and guide may be a (macroscopically) homogeneous material. The contact and the guide may be machined, e.g. by means of a subtractive machining process, from an unfinished stack, e.g. from a (sheet-like) assemblage comprising at least one material. For example, the contact and the guide may be cut and/or stamped and/or etched from an unfinished stack. The unfinished stack may be a (unitary) sheet of (at least two) layered materials, e.g. from a multi-ply sheet of materials (having two, three, or more plies). Each of the at least one material of the unfinished stack may correspond, individually, to the material(s) of the stack. The machining of the unfinished stack may shape the (unfinished) stack into a shape of the contact and the guide. The machining may transform the unfinished stack into the stack. The contact and the guide may be manufactured, e.g. by an additive and/or subtractive manufacturing process or by a combination of additive and subtractive manufacturing processes, such that each contact individually and each guide individually of the contact and guide comprises an identical layering of materials (where "identical" may refer solely to the order and type of the materials without prejudice for other features of the layering). For example, an additive manufacturing process may be used to form the contact and the guide by depositing a first material, e.g. metal, (exclusively) onto areas of a (substrate) surface, which areas correspond to a (n overall) shape of the contact and the guide, and then depositing a second material (exclusively) onto those same areas, albeit on a surface of the first material. More specifically, an additive manufacturing process may be used to deposit a first material (exclusively) in each of a plurality of disjoint regions on a substrate (that differs from the first material) and to then deposit a second material (that differs from the first material) onto the first material (exclusively) in each of the plurality of disjoint regions. Each respective individual region (where the first/second material is exclusively deposited) may constitute a respective individual one contact/guide (after separation from the substrate). Alternatively, the plurality of disjoint regions may be processed by at least one other (additive and/or subtractive) process to form the contact and/or the guide. Similarly, an additive manufacturing process may be used to deposit a (homogeneous) layer of a first material onto a substrate (that differs from the first material) and to deposit a (homogeneous) layer of a second material (that differs from the first material) onto the first material. The contact and the guide may be machined, e.g. cut and/or stamped and/or etched, from the (homogeneous) layers of first and second material. A manufacturing of the contact and the guide may be interspersed with manufacturing processes not related to a manufacture of the contact and the guide, per se. For example, a manufacturing of the contact and the guide may comprise a separating of a portion of any individual contact and/or guide from (all) others of the contact and the guide. The separated portions of the respective contact(s) and/or guide(s) may then be (rigidly) affixed to one another, e.g. by embedding the respective contact(s) and/or guide(s) in a non-conductive material. The manufacturing of the contact and the guide may comprise then separating of a remaining portion of the respective individual contact(s) and/or guide(s) from (all) others of the contact and the guide. While this paragraph speaks of "the contact and the guide" in the broad sense of "(the first contact AND/OR at least one of the (first) plurality of contacts) AND/OR at least one of the at least one guide", this paragraph applies, in particular, to "the contact and the guide" in the narrow sense of "the first contact AND each individual one of the at least one guide" OR "each individual one of the (first) plurality of contacts AND each individual one of the at least one guide". The teachings of this paragraph apply to in an unbent state of the guide and contact without being limited to an unbent state.

The assembly may comprise contact plating. For example, the assembly may comprise contact plating, e.g. gold plating, provided on a (distal) contact region of the contact and/or the guide. For each of the first contact, the (first) plurality of contacts, and the at least one guide individually, the contact plating (if present on the respective individual contact/guide) may cover less than 10% or less than 5% of an overall area of a (n outermost) surface of the respective individual contact/guide.

The first contact and/or at least one of the (first) plurality of contacts may be (rigidly) affixed to at least one of the at least one guide. For example, the first contact may be (rigidly) affixed to each individual one of the at least one guide. Similarly, each individual one of the (first) plurality of contacts may be (rigidly) affixed to each individual one of the at least one guide. The contact may be (rigidly) affixed to and electrically insulated from the guide, e.g. by an air gap and/or an electrically non-conductive material (interposed between a respective contact and a respective guide). Each individual one of the (first) plurality of contacts may be (rigidly) affixed to (and electrically insulated from) each individual other one of the (first) plurality of contacts e.g. by an air gap and/or an electrically non-conductive material (interposed between the respective contacts).

The (first) plurality of contacts and/or the at least one guide may be divided into sets. The individual contacts and/or guide(s) of any individual set may be (rigidly) affixed to any other individual contacts and/or guide(s) of the respective individual set, e.g. to all other contacts and/or guide(s) of the respective individual set, and to no contacts and/or guide(s) of any other set. The contacts of any individual set may be (at least partially) situated intermediate two guides to which the contacts are (rigidly) affixed. The guides of any individual set may constitute outermost elements of an assemblage consisting of the guides and/or contacts of the respective individual set and a (block of) unitary material (rigidly) affixing the guides and/or contacts of the respective individual set. The contact may be partially embedded in a (block of) non-conductive material, e.g. such that a portion of the contact protrudes from the (block of) non-conductive material. Similarly, the guide may be partially embedded in the (block of) non-conductive material, e.g. such that a portion of the guide protrudes from the (block of) non-conductive material. The non-conductive material may exhibit a volume resistivity greater than $10^9$ Ω·cm. For example, the non-conductive material may exhibit an electrical resistivity greater than cellulose acetate. More specifically, an electrical resistivity at 20° C. between any two points belonging to the (block of) non-conductive material may be greater than an electrical resistivity at 20° C. between two corresponding points of a component of cellulose acetate having a shape identical to the (block of) non-conductive material. The contact may protrude from the (block of) non-conductive material such that a protruding length of the contact, e.g. a maximum dimension of the protruding portion of the contact in a direction parallel to a length of the contact, is less than 5 mm, less than 2 mm, less than 1 mm, less than 0.5 mm, or less than 0.2 mm.

The (first) plurality of contacts may comprise a/the first contact, a/the second contact, and a third contact. The second contact may be situated intermediate the first contact and the third contact. For example, the second contact may be situated such that at least one imaginary straight line exists from the first contact to the third contact that intersects the second contact. Similarly, the second contact may be situated such that every imaginary straight line from the first contact to the third contact intersects the second contact. The (first) plurality of contacts may comprise a fourth contact. The fourth contact may be situated intermediate the first contact and the third contact. For example, the fourth contact may be situated such that at least one imaginary straight line exists from the first contact to the third contact that intersects the fourth contact. Similarly, the fourth contact may be situated such that every imaginary straight line from the first contact to the third contact intersects the fourth contact. As touched upon above, each of the first contact, the second contact, the third contact, and the fourth contact may be electrically insulated from each other of the first contact, the second contact, the third contact, and the fourth contact, e.g. by an air gap and/or an electrically non-conductive material (interposed between the respective contacts). Similarly, the second contact and the fourth contact may be electrically insulated from each other of the first contact, the second contact, the third contact, and the fourth contact, e.g. by an air gap and/or an electrically non-conductive material (interposed between the respective contacts), while the first contact and the third contact are electrically connected, e.g. by a connection comprised by or not comprised by the assembly. The air gap may be an air gap of at least 0.01 mm, at least 0.02 mm, at least 0.05 mm, or at least 0.1 mm.

In the case of a probe, in addition to the features disclosed in the preceding paragraph, the first contact may be situation intermediate the first guide and the second guide. If present, the second contact may be situation intermediate the first guide and the second guide. For example, the first contact may be situated such that at least one imaginary straight line exists from the first guide to the second guide that intersects the first (and second) contact. Similarly, the first contact may be situated such that every imaginary straight line from the first guide to the second guide that intersects the first (and second) contact.

The (first) plurality of contacts may be provided at a pitch of less than 5 mm, less than 2 mm, less than 1 mm, less than 0.5 mm, less than 0.2 mm, less than 0.1 mm, less than 0.05 mm, or less than 0.02 mm. A distance from the first contact to the second contact may be less than 5 mm, less than 2 mm, less than 1 mm, less than 0.5 mm, less than 0.2 mm, less than 0.1 mm, less than 0.05 mm, or less than 0.02 mm. The distance may be a (minimal) distance from a central longitudinal axis of a minimally sized imaginary rectangular cuboid enclosing the first contact to a central longitudinal axis of a minimally sized imaginary rectangular cuboid enclosing the second contact.

In the case of a probe, in addition to the features disclosed in the preceding paragraph, the first guide, the first contact, the second contact (if present), and the second guide may be provided at a pitch of less than 5 mm, less than 2 mm, less than 1 mm, less than 0.5 mm, less than 0.2 mm, less than 0.1 mm, less than 0.05 mm, or less than 0.02 mm. A distance between any two of the first guide, the first contact, the second contact, and the second guide may be less than 5 mm, less than 2 mm, less than 1 mm, less than 0.5 mm, less than 0.2 mm, less than 0.1 mm, less than 0.05 mm, or less than 0.02 mm. The distance may be measured from a center of the tip of one contact/guide to a center of the tip of another contact/guide.

The assembly may comprise at least one conductor. The at least one conductor may comprise a reference conductor. Similarly, the at least one conductor may comprise a signal conductor. For example, the at least one conductor may comprise a first signal conductor and a second signal conductor. The reference conductor and/or the (first and/or second) signal conductor may exhibit a volume resistivity of less than $10^5$ Ω·cm. The (first and/or second) signal conductor may be electrically insulated from the reference conductor. The assembly may comprise an insulation that electrically insulates the (first and/or second) signal conductor from the reference conductor. The insulation may exhibit a volume resistivity greater than $10^9$ Ω·cm. The reference conductor may electromagnetically shield at least 80% or at least 90% of a length of the (first and/or second) signal conductor. At least 80% or at least 90% of a length of the (first and/or second) signal conductor may be situated in an interior of (a tubular cavity through) the reference conductor. For example, at least 80% or at least 90% of a length of the (first and/or second) signal conductor may be situated in an interior of (a tubular cavity through) the insulation, and at least 80% or at least 90% of a length of the insulation may be situated in an interior of (a tubular cavity through) the reference conductor. At least 80% or at least 90% of a length of the (first and/or second) signal conductor may be situated radially inward of and (generally) coaxial to the reference conductor. The (first and/or second) signal conductor may be situated radially inward of the reference conductor in the sense that, for each point along at least 80% or at least 90% of a length of the (first and/or second) signal conductor, an imaginary plane through the respective point perpendicular to a longitudinal axis of the (first and/or second) signal conductor at the respective point intersects a cross-section of the reference conductor, which cross-section of the reference conductor defines a closed path (360°) around the (first and/or second) signal conductor. The reference conductor may electrically contact, e.g. be (directly) welded or soldered to, the first contact and/or the third contact, e.g. at a location inside the (block of) non-conductive material or at a location outside, proximate to, and/or adjacent to, the (block of) non-conductive material. The (first) signal conductor may electrically contact, e.g. be (directly) welded or soldered to, the second contact, e.g. at a location inside the (block of) non-conductive material. The (second) signal conductor may electrically contact, e.g. be (directly) welded or soldered to, the fourth contact, e.g. at a location inside the (block of) non-conductive material. The reference conductor, the signal conductor, and the insulation may collectively form a coaxial cable, e.g. a coaxial cable capable of transmitting a signal at a frequency in excess of 1 GHz, in excess of 5 GHz, in excess of 10 GHz, or in excess of 50 GHz via the signal conductor. The reference conductor may constitute an outer conductor of the coaxial cable, and the signal conductor may constitute an inner conductor of the coaxial cable. The reference conductor, the first signal conductor, the second signal conductor, and the insulation may collectively form a twin-axial cable, e.g. a twin-axial cable capable of transmitting a signal at a frequency in excess of 1 GHZ, in excess of 5 GHZ, in excess of 10 GHz, or in excess of 50 GHz via the first and second signal conductors. The reference conductor, the first signal conductor, the second signal conductor, a third signal conductor, and the insulation may collectively form a triaxial cable, e.g. a triaxial cable capable of transmitting a signal at a frequency in excess of 1 GHZ, in excess of 5 GHz, in excess of 10 GHz, or in excess of 50 GHz via the first, second, and third signal conductors. The reference conductor may constitute an outer conductor of the twin-axial cable, and the first/second/third signal conductor may constitute a first/second/third inner conductor of the twin-axial/triaxial cable.

In the case of a probe, in addition to the features disclosed in the preceding paragraph, the first signal conductor may electrically contact, e.g. be (directly) welded or soldered to, the first contact, e.g. at a location inside the (block of) non-conductive material. The reference conductor may electrically contact, e.g. be (directly) welded or soldered to, the first guide and the second guide, e.g. at a location inside the (block of) non-conductive material. The second signal conductor may electrically contact, e.g. be (directly) welded or soldered to, the second contact, e.g. at a location inside the (block of) non-conductive material. As touched upon above, the assembly may comprise three, four, or five contacts in a GSG, GSSG, or GSSSG configuration. The reference conductor may electrically contact, e.g. be (directly) welded or soldered to, the G-contacts of the GSG/GSSG/GSSSG configuration, e.g. at a location inside the (block of) non-conductive material. Each individual S-contact of the GSG/GSSG/GSSSG configuration may electrically contact, e.g. be (directly) welded or soldered to, a respective signal conductor, e.g. at a location inside the (block of) non-conductive material.

The at least one conductor may comprise a first conductor and a second conductor. The first and/or second conductor may exhibit a volume resistivity of less than $10^5$ Ω·cm. The first conductor may be electrically insulated from the second conductor. The assembly may comprise an insulation that electrically insulates the first conductor from the second conductor and/or an ambient environment of the first conductor. Similarly, the assembly may comprise an insulation that electrically insulates the second conductor from an ambient environment of the second conductor. The insulation may exhibit a volume resistivity greater than $10^9$ Ω·cm. The first conductor may electrically contact, e.g. be (directly) welded or soldered to, the first contact, e.g. at a location inside the (block of) non-conductive material. The second conductor may electrically contact, e.g. be (directly) welded or soldered to, the second contact, e.g. at a location inside the (block of) non-conductive material. The first and second conductors may constitute a twisted pair of a twisted-pair cable, e.g. a twisted-pair cable capable of transmitting a signal at a frequency in excess of 1 GHZ, in excess of 5 GHZ, in excess of 10 GHz, or in excess of 50 GHz via the first and second conductors. Any individual conductor of the at least one conductor may be a conductive trace on a flexible (non-conductive) substrate.

Any of the at least one guide may be (individually or collectively) shaped to (individually/collectively) engage a (guiding) component, e.g. a socket. In particular, any of the at least one guide may be (individually or collectively) shaped to (individually/collectively) engage the (guiding) component such that a position of the guide relative to the (guiding) component is delimited (as a first delimitation) in a direction parallel to the common layer and perpendicular to a longitudinal axis of an individual one of the contacts, e.g. an individual one of the first contact and/or the (first) plurality of contacts. Similarly, any of the at least one guide may be (individually or collectively) shaped to (individually/collectively) engage the (guiding) component such that a position of the guide relative to the (guiding) component is delimited (as a first delimitation) in a direction parallel to (an edge of a respective imaginary rectangular cuboid that defines) a width of an individual one of the contacts. The first delimitation may delimit the position of the guide relative to the (guiding) component such that a position of the guide relative to the (guiding) component is accurate to within 0.2 mm, to within 0.1 mm, to within 0.05 mm, to within 0.02 mm, to within 0.01 mm, or to within 0.005 mm. Similarly, the first delimitation may delimit the position of the guide relative to the (guiding) component such that a range of motion of the guide relative to the (guiding) component is not more than 0.2 mm, not more than 0.1 mm, not more than 0.05 mm, not more than 0.02 mm, not more than 0.01 mm, or not more than 0.005 mm. To this aim, (any of) the at least one guide may individually/collectively define at least one pair of opposing sides that intersect a (respective) imaginary straight line parallel to the common layer and perpendicular to the longitudinal axis of the individual one of the contacts and/or a (respective) imaginary straight line parallel to (an edge of a respective imaginary rectangular cuboid that defines) a width of an individual one of the contacts. The longitudinal axis of the contact may be a central longitudinal axis of a minimally sized imaginary rectangular cuboid enclosing the (respective individual) contact. Any of the opposing sides may intersect the imaginary straight line at an angle of less than 60° from perpendicular, less than 45° from perpendicular, less than 30° from perpendicular, less than 20° from perpendicular, less than 10° from perpendicular, or less than 5° from perpendicular. In embodiments in which the contact is rigidly affixed to the guide, the teachings of this paragraph regarding the position of the guide relative to the (guiding)

component apply, mutatis mutandis, to the position of the contact relative to the (guiding) component.

Any of the at least one guide may be (individually or collectively) shaped to (individually/collectively) engage a (guiding) component such that a position of the contact relative to the (guiding) component is delimited (as a second delimitation) in a direction parallel to a longitudinal axis of an individual one of the contacts, e.g. an individual one of the first contact and/or the (first) plurality of contacts. The second delimitation may delimit the position of the guide relative to the (guiding) component such that a position of the guide relative to the (guiding) component is accurate to within 1 mm, to within 0.5 mm, to within 0.2 mm, or to within 0.1 mm. Similarly, the second delimitation may delimit the position of the guide relative to the (guiding) component such that a range of motion of the guide relative to the (guiding) component is not more than 1 mm, not more than 0.5 mm, not more than 0.2 mm, or not more than 0.1 mm. In embodiments in which the contact is rigidly affixed to the guide, the teachings of this paragraph regarding the position of the guide relative to the (guiding) component apply, mutatis mutandis, to the position of the contact relative to the (guiding) component.

As stated above, any of the at least one guide may be (individually) shaped to (individually) engage a (guiding) component. For example, any of the at least one guide may comprise at least one engagement structure, and the (guiding) component may comprise at least one counterpart engagement structure. Any (individual) engagement structure may (matingly) engage at least one counterpart engagement structure. The engagement structure may comprise or consist of a pin-shaped region, a peg-shaped region, and/or a protrusion. Similarly, the engagement structure may comprise an opening, hole, receptacle, or cavity (that (matingly) receives a counterpart engagement structure of the (guiding) component. The counterpart engagement structure may comprise or consist of a pin-shaped region, a peg-shaped region, and/or a protrusion. Similarly, the counterpart engagement structure may comprise an opening, hole, receptacle, or cavity (that (matingly) receives an engagement structure of the guide). The engagement structure and/or counterpart engagement structure may have a (partial) shape of a dovetail, a trapezoid, an ellipse, or a circle. The engagement structure may (matingly) engage the counterpart engagement structure, e.g. in an engaged state of the guide and the (guiding) component, in a manner that delimits a position of the (respective) guide relative to the (guiding) component in at least one dimension, e.g. to within a tolerance as described above. Any individual engagement structure may define a respective pair of the at least one pair of opposing sides. The engagement structure may (be bent to) protrude beyond a thickness of any individual one of the first contact and/or the (first) plurality of contacts. For example, the engagement structure may (be bent to) protrude outside a space intermediate two imaginary planes each coplanar to a respective side of an imaginary rectangular cuboid and orthogonal to a shortest edge of the imaginary rectangular cuboid, which imaginary rectangular cuboid is a minimally sized, imaginary rectangular cuboid that encloses any individual one of the first contact and/or the (first) plurality of contacts. Similarly, the engagement structure may protrude beyond a length of any individual one of the first contact and/or the (first) plurality of contacts. For example, the engagement structure may protrude outside a space intermediate two imaginary planes each coplanar to a respective side of an imaginary rectangular cuboid and orthogonal to a longest edge of the imaginary rectangular cuboid, which imaginary rectangular cuboid is a minimally sized, imaginary rectangular cuboid that encloses any individual one of the first contact and/or the (first) plurality of contacts. The counterpart engagement structure may protrude into (an interior of) the imaginary rectangular cuboid, e.g. in an engaged state of the guide and the (guiding) component, As stated above, any of the at least one guide may be (collectively) shaped to (collectively) engage a (guiding) component. For example, (any of) the at least one guide may protrude beyond a collective width of the first contact and/or the (first) plurality of contacts. Any pair of opposing sides may be situated in a region of the guide that protrudes beyond the collective width of the first contact and/or the (first) plurality of contacts. For example, each opposing side of a respective pair may be situated outside a space intermediate two imaginary planes each coplanar to a respective side of an imaginary rectangular cuboid and orthogonal to a direction defining a width of an individual one of the first contact and/or the (first) plurality of contacts, which imaginary rectangular cuboid is a minimally sized, imaginary rectangular cuboid that encloses the first contact and/or the (first) plurality of contacts.

The assembly may comprise a second plurality of (electrically conductive) contacts, e.g. a plurality of contacts in planar arrangement on a surface. The surface may be a surface of a printed circuit board (PCB), a surface of a die of an integrated circuit, or a surface of a package substrate of a package. For example, the second plurality of contacts may consist of a plurality of contact pads and/or (signal, clock, and/or ground) traces situated on a surface of a printed circuit board (PCB), on a surface of a die of an integrated circuit, or on a surface of a package substrate. The second plurality of contacts may be arranged such that, for at least one individual contact of the first plural of contacts, the respective individual contact contacts only one (respective) individual contact of the second plural of contacts (in a fully engaged state of the at least one guide and the (guiding) component). For example, the second plurality of contacts may be arranged such that, for each individual contact of the first plural of contacts, the respective individual contact contacts only one (respective) individual contact of the second plural of contacts (in a fully engaged state of the at least one guide and the (guiding) component.

As touched upon above, at least one of the at least one guide may be shaped to engage a (guiding) component, e.g. a socket. The (guiding) component may be mounted on the surface (of the PCB/die/package substrate). Similarly, the (guiding) component may be formed, e.g. by an additive and/or subtractive manufacturing process, on or integrally with the surface (of the PCB/die/package substrate). Similarly, the PCB/die/package substrate may constitute the (guiding) component. For example, the PCB/die/package substrate may comprise at least one hole, e.g. at least one hole shaped to receive at least one portion of the guide, for example a pin-shaped region, a peg-shaped region, and/or a protrusion of the guide. More generally, the PCB/die/package substrate may define/comprise a counterpart engagement structure (suitable to (matingly) engage (at least a portion of) an engagement structure of the at least one guide), e.g. as described above.

The (guiding) component may define at least one pair of opposite sides. In an engaged state of the guide and the (guiding) component, any pair of opposite sides may intersect an imaginary straight line parallel to the common layer and perpendicular to the longitudinal axis of any individual one of the (first or second plurality of) contacts. The longitudinal axis of the (respective individual) contact may be a central longitudinal axis of a minimally sized imaginary rectangular cuboid enclosing the (respective individual) contact. In particular, the imaginary straight line (that intersects the (respective individual) pair of opposite sides) may be the (aforementioned) imaginary straight line that intersects a (respective individual) pair of opposing sides. Any of the opposite sides may intersect the imaginary straight line at an angle of less than 60° from perpendicular, less than 45° from perpendicular, less than 30° from perpendicular, less than 20° from perpendicular, less than 10° from perpendicular, or less than 5° from perpendicular. The engaged state may be a matingly engaged state.

Any (individual) pair of opposing sides defined individually/collectively by the guide may (be shaped to) engage a respective (individual) pair of opposite sides defined by the (guiding) component, e.g. such that a position of the guide—and consequently of any contact affixed thereto—relative to the (guiding) component is delimited in a direction parallel to the common layer and perpendicular to a longitudinal axis of an individual one of the contacts and/or in a direction parallel to (an edge of a respective imaginary rectangular cuboid that defines) a width of an individual one of the contacts. For example, a first distance between the opposing sides of a pair of opposing sides (along the (respective, aforementioned) imaginary straight line) may be shorter than a second distance between the opposite sides of a pair of opposites sides (along the (respective, aforementioned) imaginary straight line), a difference between the first and second distance being not more than 0.2 mm, not more than 0.1 mm, not more than 0.05 mm, not more than 0.02 mm, not more than 0.01 mm, or not more than 0.005 mm. Any of the at least one guide and/or the (guiding) component may comprise at least one (second) taper that delimits an engagement motion of the guides relative to the (guiding) component, e.g. that restricts the engagement motion to an increasingly narrower range as the degree of engagement (engaged state versus non-engaged state) increases. The guide and/or the (guiding) component may comprise at least one other structure that delimits an engagement motion of the guides relative to the (guiding) component, e.g. in conjunction with the (second) taper. The (second) taper (and the at least one other structure) may delimit the engagement motion such that the guide is guided by the (second) taper during engagement motion to a (matingly) engaged state. Similarly, the (second) taper (and the at least one other structure) may delimit the engagement motion such that each (individual) pair of opposing sides is (guided to be) situated intermediate the respective (individual) pair of opposite sides (in an engaged state of the guide and the (guiding) component).

The assembly may be structured such that, in an engaged state of the (guiding) component and the guide, each individual contact of the first plurality of contacts respectively contacts one individual contact of the second plurality of contacts.

The assembly may comprise a housing. The housing may be a one-piece housing or a multi-piece housing, i.e. a housing comprising at least two housing parts (that collectively constitute the housing). Any two (or more) of the at least two housing parts may be structured (e.g. in terms of shape and/or material) to snappingly engage and/or to fit snuggly. The housing and/or any housing part may be of an electrically conductive material, e.g. tin plate, an electrically insulating material, e.g. plastic, or a conglomeration of at least one electrically conductive material and at least one electrically insulating material. The electrically conductive material may be a material that exhibits a volume resistivity of less than $10^5$ Ω·cm. The electrically insulating material may a material that exhibits a volume resistivity greater than $10^9$ Ω·cm. The contact and the guide may be elastically supported relative to the housing, e.g. via any of the at least one conductor and/or by cable(s) comprising any of the at least one conductor and/or by a flexible substrate comprising any of the at least one conductor. For example, the contact and the guide may be elastically supported relative to the housing, e.g. via any of the first conductor, the second conductor, the reference conductor, the (first) signal conductor, and/or the (second) signal conductor.

The housing may comprise at least one first guide structure. The housing may be structured to (matingly) engage the (guiding) component. The (guiding) component may comprise at least one first counterpart guide structure. The first guide structure may serve (together with the first counterpart guide structure) to provide a first degree of alignment between the housing and the (guiding) component (in one, two, or three dimensions), e.g. in a (fully) engaged state of the housing and the (guiding) component. The first guide structure and/or the first counterpart guide structure may comprise at least one (first) taper that delimits an engagement motion of the housing relative to the (guiding) component, e.g. that restricts the engagement motion to an increasingly narrower range as the degree of engagement (engaged state versus non-engaged state) increases. A maximum range of motion permitted by the first degree of alignment between the housing and the (guiding) component (in one, two, or three dimensions), e.g. in a (fully) engaged state of the housing and the (guiding) component, may be less than 1 mm, less than 0.5 mm, less than 0.2 mm, or less than 0.1 mm.

Any of the at least one guide may serve (together with the (guiding) component) to provide a second degree of alignment between the first plurality of contacts and the second plurality of contacts (in one, two, or three dimensions), e.g. in a (fully) engaged state of the guide and the (guiding) component. The second degree of alignment may be a more accurate degree of alignment than the first degree of alignment. For example, the second degree of alignment may restrict a range of motion of the first plurality of contacts relative to the second plurality of contacts (in at least one dimension, e.g. in a direction parallel to (an edge of an imaginary rectangular cuboid that defines) a width of any individual one of the contacts and/or in a direction parallel to the common layer and perpendicular to a longitudinal axis of an individual one of the contacts) to not more than 70%, not more than 50%, not more than 20%, or not more than 10% of a range of motion to which the first degree of alignment restricts the housing relative to the (guiding) component (in the respective dimension/direction). The second degree of alignment may delimit a range of motion of the first plurality of contacts relative to the second plurality of contacts (in one, two, or three individual dimensions, e.g. in a direction parallel to (an edge of an imaginary rectangular cuboid that defines) a width of any individual one of the contacts and/or in a direction parallel to the common layer and (less than 20°, less than 10°, or less than 5° from) perpendicular to a longitudinal axis of an individual one of the contacts) to not more than 0.2 mm, not more than 0.1 mm, not more than 0.05 mm, not more than 0.02 mm, not more than 0.01 mm, or not more than 0.005 mm. The second degree of alignment may delimit a range of motion of the first plurality of contacts relative to the second plurality of contacts in a direction parallel to a longitudinal axis of an individual one of the contacts to not more than 1 mm, not more than 0.5 mm, not more than 0.2 mm, or not more than 0.1 mm.

The at least one conductor may be grouped into one, two, three, four, or more sets of conductors. Similarly, as already touched upon above, the contacts may be grouped into sets. The at least one conductor may be grouped such that the contacts (welded or soldered to the respective conductors or otherwise in electrical contact therewith) are (correspondingly) grouped into one, two, three, four, or more parallel sets of parallel contacts, i.e. into one, two, three, four, or more parallel rows of contacts. Similarly, the second plurality of contacts may be grouped into one, two, three, four, or more parallel sets of parallel contacts, i.e. into one, two, three, four, or more parallel rows of contacts. A distance from a distal tip of a contact belonging to one set/row to a distal tip of a contact belonging to another set/row may be at least 2, at least 5, at least 10, or at least 20 times a pitch of contacts belonging to the one or the other set/row. Similarly, a distance from a distal tip of a contact belonging to one set/row to a distal tip of a contact belonging to another set/row may be at least 2, at least 5, at least 10, or at least 20 times a (minimal) distance from a central longitudinal axis of a minimally sized imaginary rectangular cuboid enclosing a contact of the one set/row to a central longitudinal axis of a minimally sized imaginary rectangular cuboid enclosing a neighboring contact of the one set/row. Any individual block of unitary material (rigidly) affixing a set of guides and/or contacts may support one, two, three, four, or more parallel rows of contacts. For example, e.g. in an assembly comprising four parallel rows of contacts, a first block of material may support two parallel rows of contacts, and a second block of material may support another two parallel rows of contacts. Similarly, e.g. in an assembly comprising two parallel rows of contacts, a first block of material may support one row of parallel contacts, and a second block of material may support another row of parallel contacts. Likewise, e.g. in an assembly comprising four parallel rows of contacts, a (single) block of material may support (all) four parallel rows of contacts.

The contacts of any individual row may be arranged in clusters, e.g. in clusters of three or four contacts. For example, the first contact, second contact, and third contact may constitute a cluster. Similarly, the first contact, second contact, third contact, and fourth contact may constitute a cluster. A minimum distance between one cluster and a neighboring other cluster may be at least 4, at least 8, or at least 10 times a minimum distance between any two contacts of the one cluster (and at least 4, at least 8, or at least 10 times a minimum distance between any two contacts of the other cluster).

The present disclosure teaches a method. The method may be a manufacturing method, e.g. a method for manufacturing an assembly as described above. Similarly, the method may be a method for manufacturing a probe as described above The method may comprise manufacturing a first plurality of contacts, e.g. a first plurality of contacts as described above. Similarly, the method may comprise manufacturing a at least one guide, e.g. at least one guide as described above. The manufacturing of a first plurality of contacts and/or at least one guide may comprise cutting the first plurality of contacts and/or the at least one guide from a single sheet of metal or from a stack of (at least two) layered materials. Similarly, the manufacturing of a first plurality of contacts and/or at least one guide may comprise etching the first plurality of contacts and/or the at least one guide from a unitary layer of metal or from a stack of (at least two) layered materials. Similarly, the manufacturing of a first plurality of contacts and/or at least one guide may comprise forming, e.g. by an additive manufacturing process, the first plurality of contacts and/or the at least one guide by depositing at least one material onto areas of a surface, which areas correspond to a shape of the first plurality of contacts/the at least one guide.

The method may comprise forming an electrical contact, e.g. as described above, between a reference conductor and at least one of a first contact and a third contact. Similarly, the method may comprise forming an electrical contact, e.g. as described above, between a (first) signal conductor and a second contact. Similarly, the method may comprise forming an electrical contact, e.g. as described above, between a (second) signal conductor and a fourth contact. The method may comprise forming an electrical contact, e.g. as described above, between a first conductor and a first contact. Similarly, the method may comprise forming an electrical contact, e.g. as described above, between a second conductor and a second contact.

The method may comprise providing a second plurality of contacts, e.g. as described above, in planar arrangement on a surface.

The method may comprise providing a housing, e.g. as described above

The various embodiments of the present disclosure having been described above in general terms, the embodiments shown in the Figures will now be elucidated.

FIG. 1 shows, in schematic representation, details of a first embodiment of an assembly 100 in accordance with the present disclosure, e.g. as described above.

Specifically, FIG. 1 shows four contacts 110 and one guide 120 of assembly 100 in an unbent state. In the illustrated embodiment, assembly 100 comprises a stack 130 comprising a first layer 132 of a first material and a second layer 134 of a second material. Each of contacts 110 comprises a respective portion 112 of first layer 132 and a respective portion 114 of second layer 134. Guide 120 likewise comprises a respective portion 122 of first layer 132 and a respective portion 124 of second layer 134. First imaginary straight line 102 represents a line in a first imaginary plane that intersects each of contacts 110 and guide 120, where an entire volume of material belonging to an intersection of the first imaginary plane with contacts 110 and guide 120 is the first material. Second imaginary straight line 102' represents a line in a second imaginary plane—parallel to the first plane—that intersects each of contacts 110 and guide 120, where an entire volume of material belonging to an intersection of the second imaginary plane with contacts 110 and guide 120 is the second material.

Figure 2:
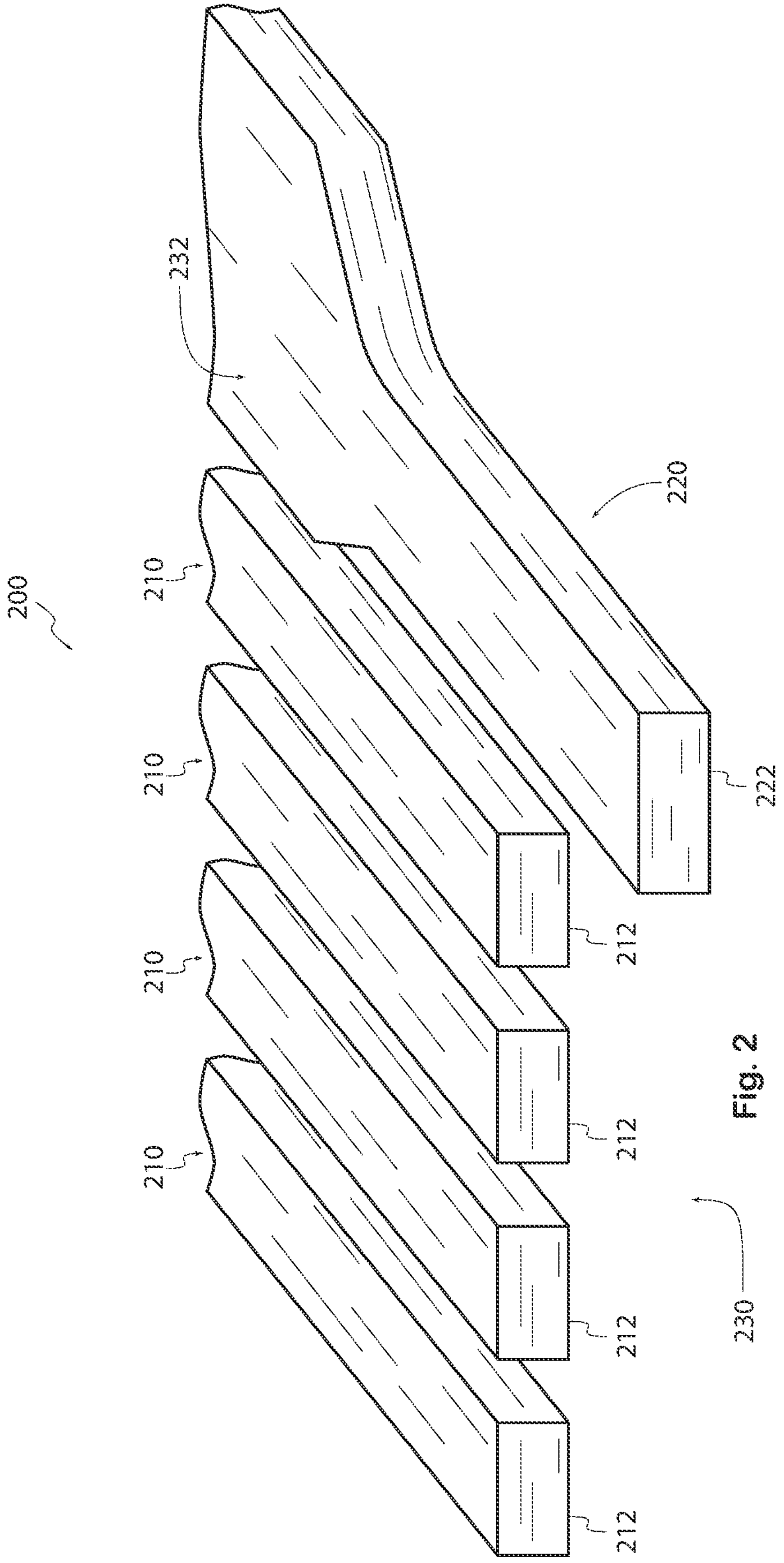
FIG. 2 shows details of a second embodiment of an assembly in accordance with the present disclosure.

FIG. 2 shows, in schematic representation, details of a second embodiment of an assembly 200 in accordance with the present disclosure, e.g. as described above.

Specifically, FIG. 2 shows four contacts 210 and one guide 220 of assembly 200 in an unbent state. In the illustrated embodiment, assembly 200 comprises a stack 230 comprising a single layer 232 of material. Each of contacts 210 comprises a respective portion 212 of layer 232. Guide 220 likewise comprises a respective portion 222 of layer 232.

Figure 3:
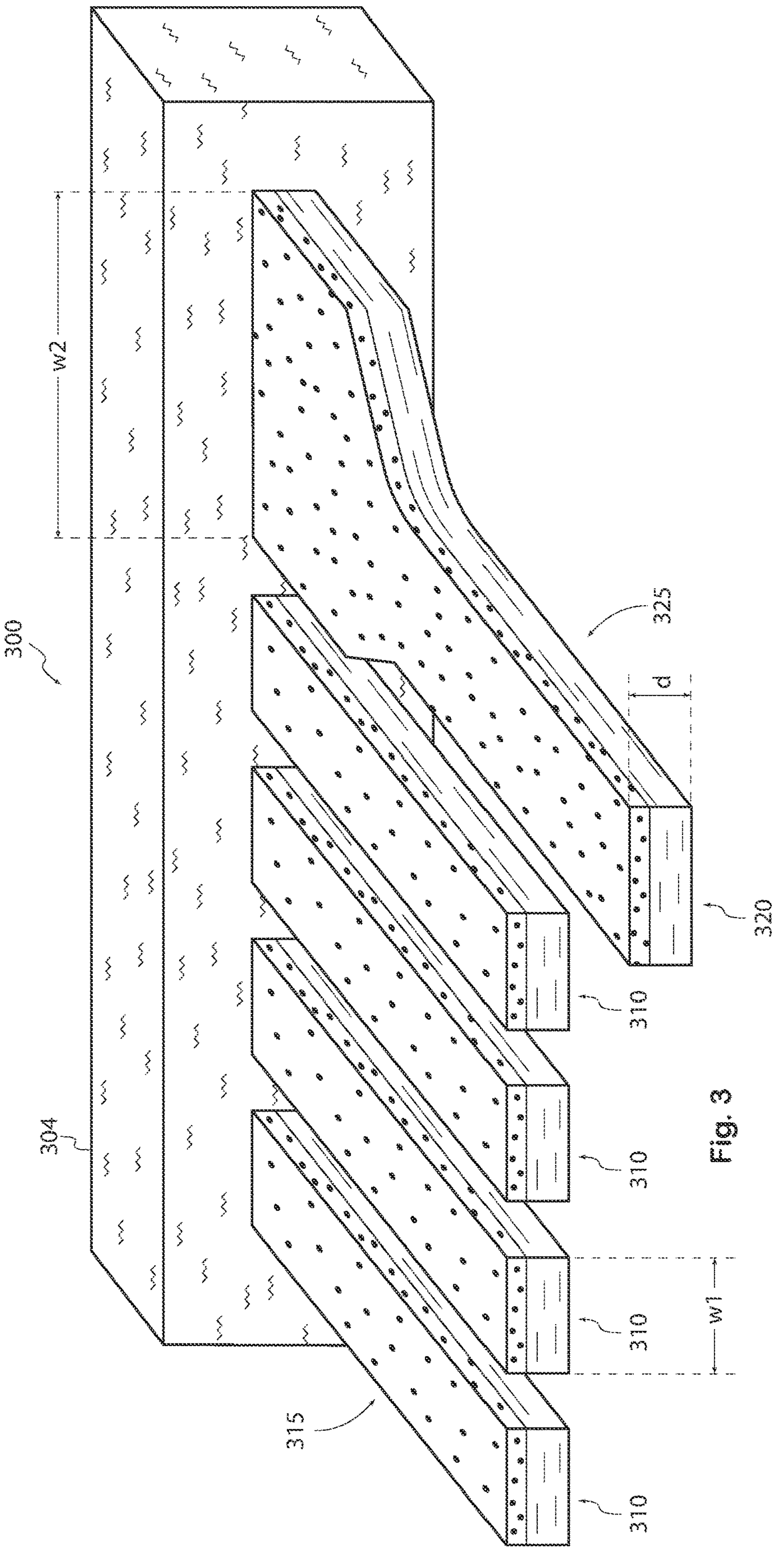
FIG. 3 shows details of a third embodiment of an assembly in accordance with the present disclosure.

FIG. 3 shows, in schematic representation, details of a third embodiment of an assembly 300 in accordance with the present disclosure, e.g. as described above.

Specifically, FIG. 3 shows four contacts 310 and one guide 320 of assembly 300 in an unbent state. In the illustrated embodiment, assembly 200 comprises block of non-conductive material 304 that rigidly affixes each contacts 310 to one another and to guide 320. Each of contacts 310 is partially embedded in the block of non-conductive material 304 such that a portion 315 of each contact 310 protrudes from the block of non-conductive material 304. Similarly, guide 320 is partially embedded in the block of non-conductive material 304 such that a portion 325 of guide 320 protrudes from the block of non-conductive material 304. For the sake of exemplifying width and thickness directions, reference sign w1 designates a width of one contact 310, reference sign w2 designates a width of guide 320, and reference sign d designates a thickness of guide 320 that corresponds to a thickness of contacts 310.

FIG. 4A to 4D show, in schematic representation, a fourth embodiment of an assembly 400 in accordance with the present disclosure, e.g. as described above.

In the embodiment illustrated in FIGS. 4A to 4D, assembly 400 comprises a first plurality of contacts 410, 410', a plurality of guides 420, 420', a housing 440, a plurality of twin-axial cables 450, 450', and a guiding component in the form of a socket 460 mounted on a printed circuit board 480. Contacts 410, 410' and guides 420, 420' are elastically supported in housing 440 by cables 450, 450'. Housing 440 comprises a guide structure 446 structured to engage a counterpart guide structure 466 of socket 460. The thirty-two contacts 410, 410' are grouped into two sets of contacts. The sixteen contacts 410 of a first set are arranged in a first row 411 of parallel contacts, and the sixteen contacts 410' of a second set are arranged in a second row 411' of parallel contacts. Row 411 is parallel to row 411'. Contacts 410 of the first set are rigidly affixed to guides 420 by a first block of non-conductive material 404. Contacts 410' (four of which are designated individually as 410A' to 410D' in FIG. 4C) of the second set are rigidly affixed to guides 420' by a second block of non-conductive material 404'. The eight twin-axial cables 450, 450' are likewise grouped into two sets of cables. The conductors of the four twin-axial cables 450 of a first set are connected to contacts 410, and the conductors of the four twin-axial cables 450' (designated individually as 450A' to 450D' in FIG. 4C) of a second set are connected to contacts 410'. Printed circuit board 480 comprises a second plurality of contacts 482, 482' that are likewise grouped into two sets of contacts. The sixteen contacts 482 of a first set are arranged in a first row 483 of parallel contacts, and the sixteen contacts 482' of a second set are arranged in a second row 483' of parallel contacts. Row 483 is parallel to row 483'. Contacts 482, 482' of the second plurality are arranged to individually contact respective contacts 410, 410' of the first plurality in a (fully) engaged state of housing 440 and socket 460.

Figure 4A:
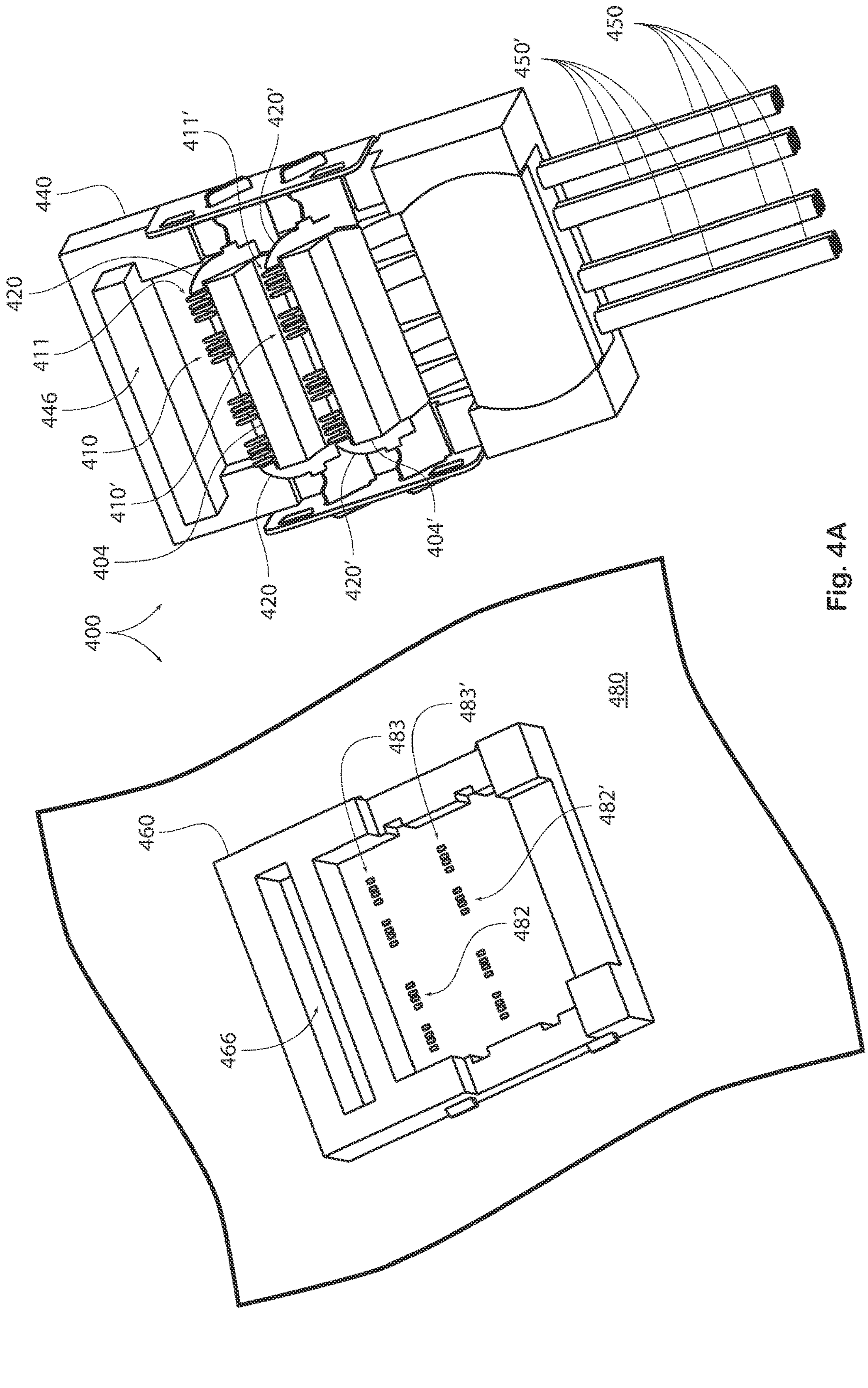
FIGS. 4A to 4D show a fourth embodiment of an assembly in accordance with the present disclosure.
Figure 4B:
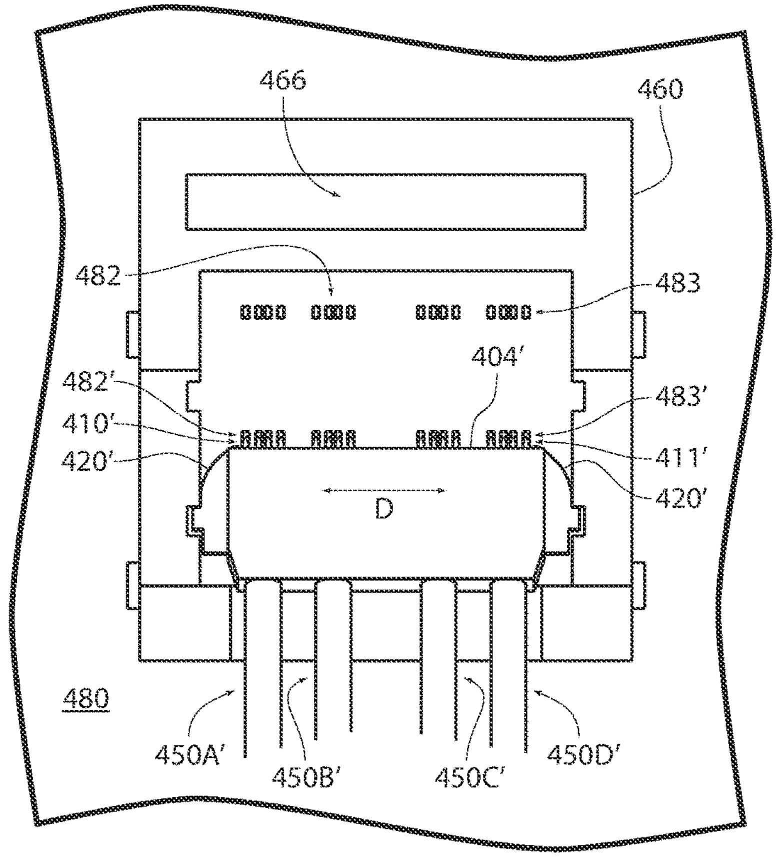
Figure 4C:
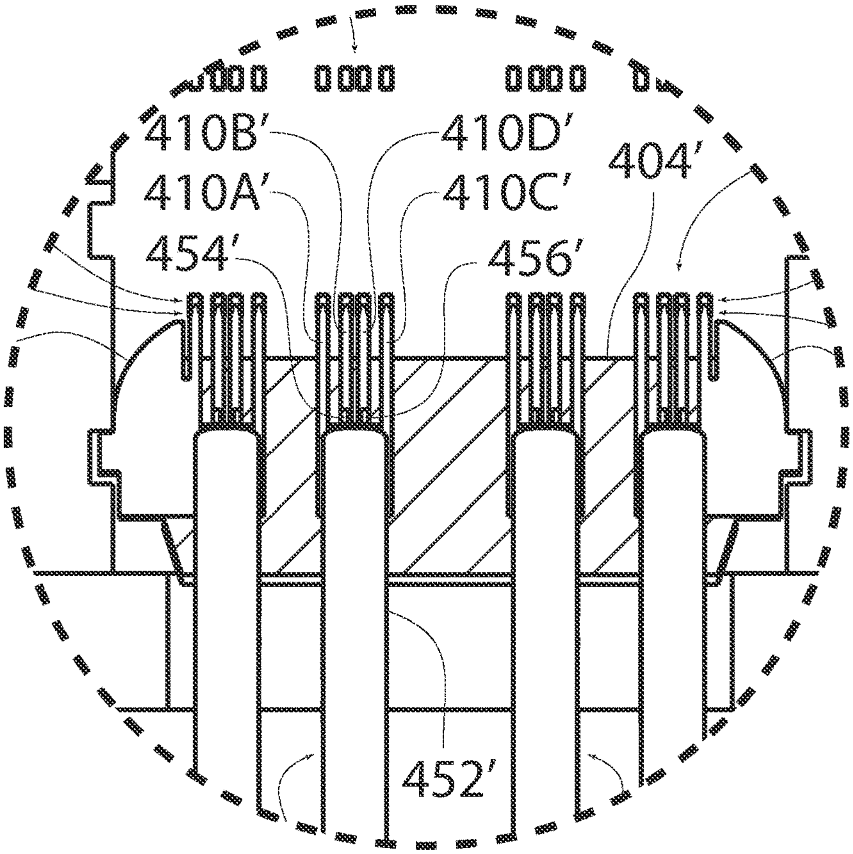
Figure 4D:
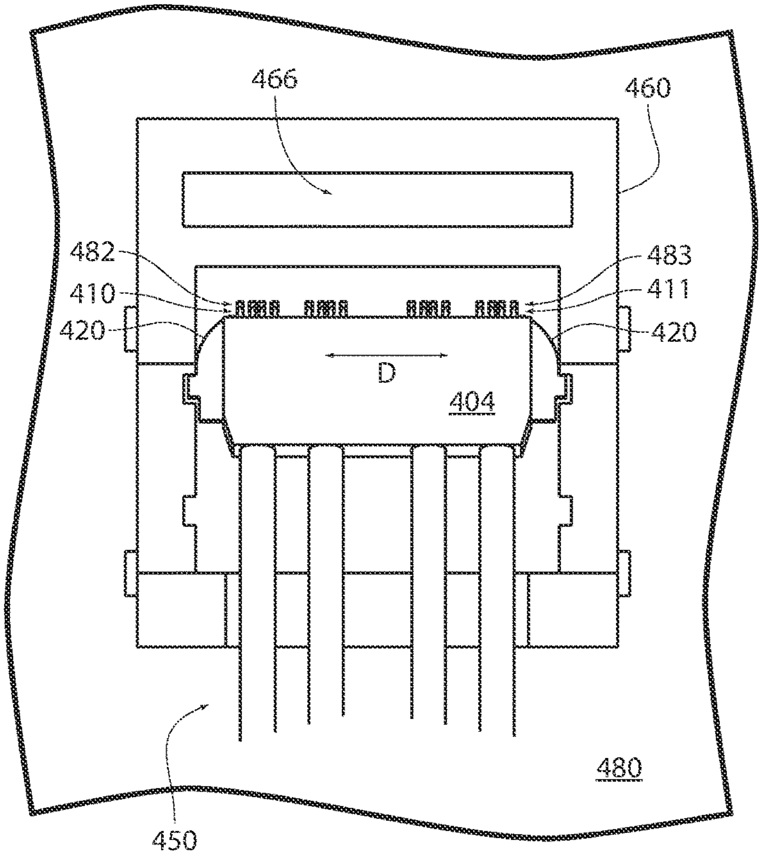

FIGS. 48 to 4D schematically depict details of assembly 400 in a fully engaged state of housing 440 and socket 460, albeit with many elements of assembly 400 not being depicted for the sake of better visibility of the detailed features.

As shown in FIGS. 4B and 4C, guides 420'—collectively—engage socket 460 in a manner that provides a second degree of alignment and delimits a range of motion of contacts 410' relative to contacts 482' (not depicted in FIG. 4B) in a direction D parallel to a common layer of the guides and contacts and perpendicular to a longitudinal axis of an individual one of the contacts.

FIG. 4C depicts a magnified and annotated details of FIG. 4B, the second block of non-conductive material 404' being depicted in a cut-away cross-section to reveal further details of contacts 410', guides 420' and cables 450'. As schematically depicted in FIG. 4C, contacts 410' contact the second plurality of contacts 482' in an interior of the second block of non-conductive material 404'. Inter alia, a reference conductor 452' of twin-axial cable 450B' electrically contacts a first contact 410A' and a third contact 410C', a first signal conductor 454' of twin-axial cable 450B' electrically contacts a second contact 410B', and a second signal conductor 456' of twin-axial cable 450B' electrically contacts a fourth contact 410D'. Third contact 410C' and fourth contact 410D' are situated intermediate first contact 410A' and third contact 410C'. As shown in FIG. 4C, guides 420' constitute outermost elements of the assemblage consisting of guides 420', contacts 410', and the second block of non-conductive material 404', at least part of each of contacts 410' of row 483' being situated intermediate guides 420' to which contacts 410' are affixed by the second block of non-conductive material 404'.

As shown in FIG. 4D, guides 420 likewise—collectively—engage socket 460 in a manner that provides a second degree of alignment and delimits a range of motion of contacts 410 relative to contacts 482 (not depicted in FIG. 4D) in direction D parallel to a common layer of the guides and contacts and perpendicular to a longitudinal axis of an individual one of the contacts.

Figure 5:
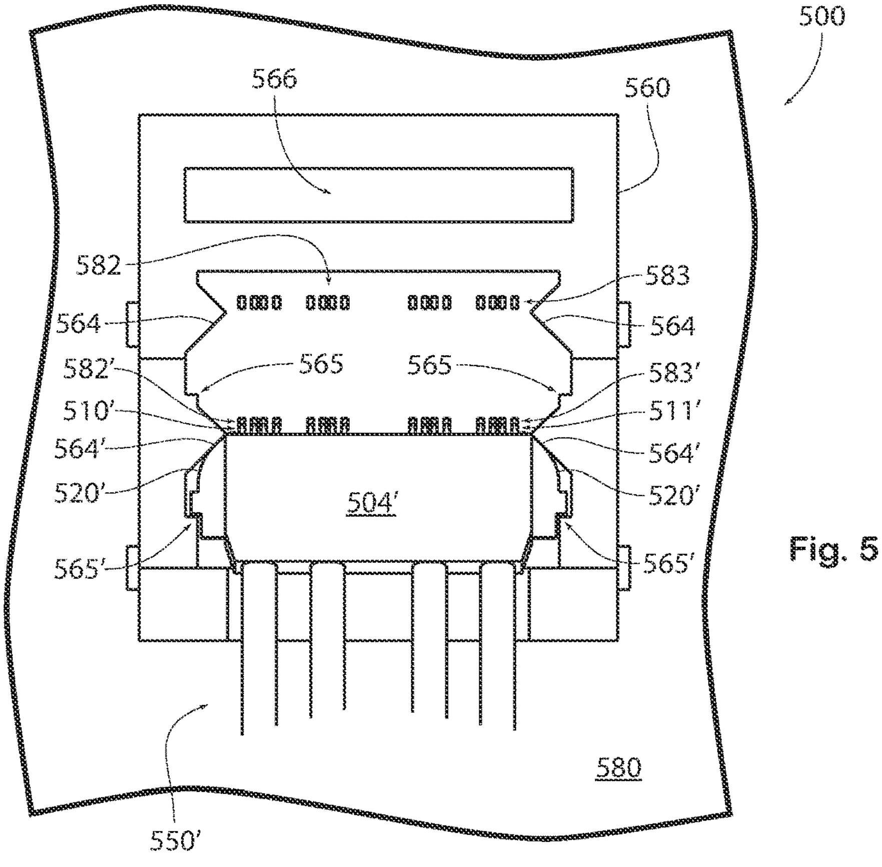
FIG. 5 shows a fifth embodiment of an assembly in accordance with the present disclosure.

FIG. 5 shows, in schematic representation, a fifth embodiment of an assembly 500 in accordance with the present disclosure, e.g. as described above.

In the embodiment illustrated in FIG. 5, assembly 500 comprises a first plurality of contacts 510', a plurality of guides 520', a plurality of cables 550', and a guiding component in the form of a socket 560 mounted on a printed circuit board 580. Socket 560 comprises a counterpart guide structure 566 structured to engage, in other embodiments comprising a housing, a guide structure of the housing. Contacts 510' are arranged in a row 511' of parallel contacts and are rigidly affixed to guides 520' by a block of non-conductive material 504'. Printed circuit board 580 comprises a second plurality of contacts 582, 582' that are grouped into two sets of contacts. The sixteen contacts 582 of a first set are arranged in a first row 583 of parallel contacts, and the sixteen contacts 582' of a second set are arranged in a second row 583' of parallel contacts. Row 583 is parallel to row 583'. Socket 560 comprises tapers 564, 564' and other structures, here in the form of corners 565, 565'. Tapers 564' delimit an engagement motion of guides 520' relative to socket 560 in conjunction with corners 565'. Contacts 582' are arranged to individually contact respective contacts 510' in the depicted, fully engaged state of socket 560 and guides 520' rigidly affixed to contacts 510'.

Figure 6:
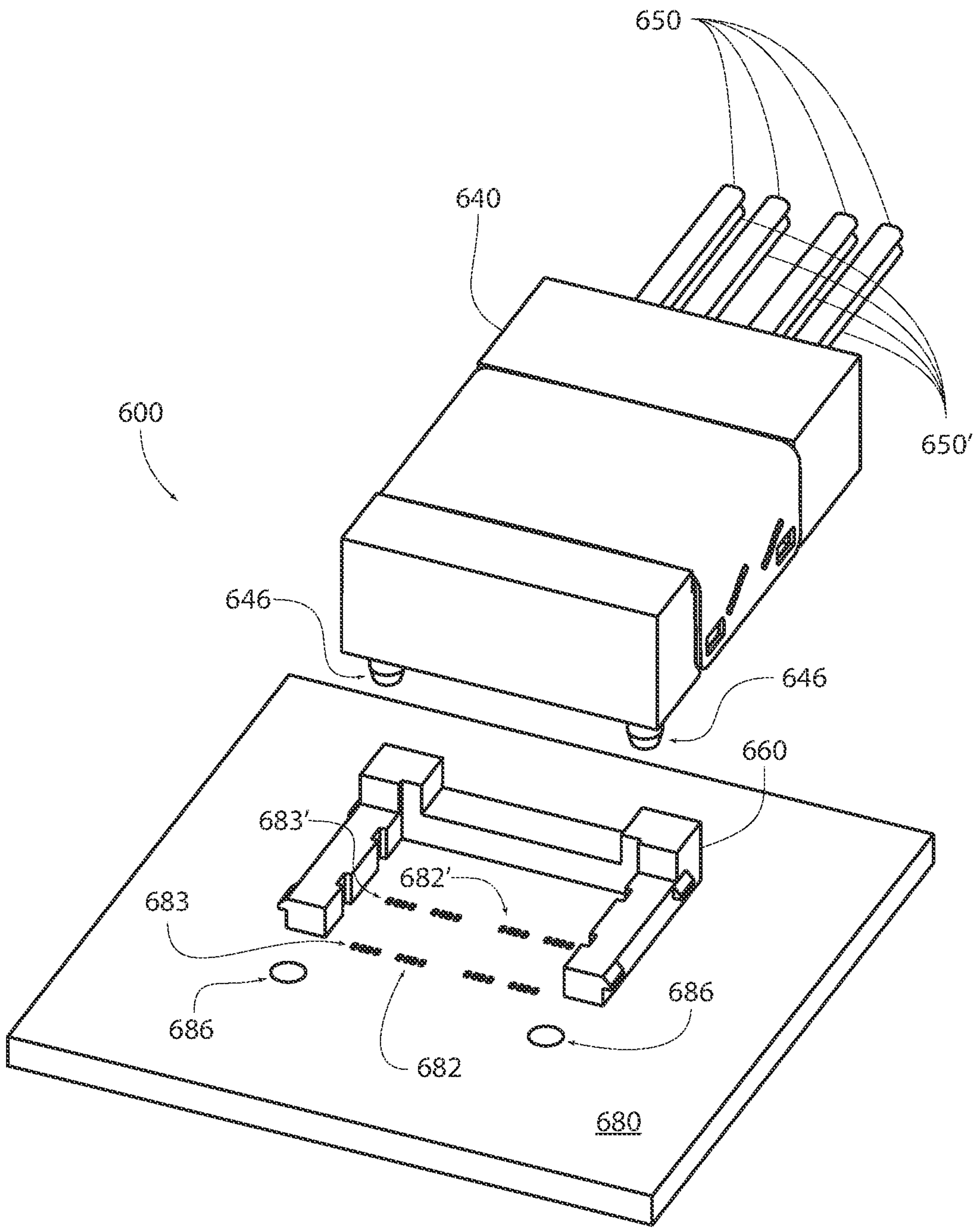
FIG. 6 shows a sixth embodiment of an assembly in accordance with the present disclosure.

FIG. 6 shows, in schematic representation, a sixth embodiment of an assembly 600 in accordance with the present disclosure, e.g. as described above.

In the embodiment illustrated in FIG. 6, assembly 600 comprises a first plurality of contacts and a plurality of guides (not visible), a housing 640, a plurality of cables 650, and a guiding component in the form of a printed circuit board (PCB) 680 and a socket 660 mounted on PCB 680. Housing 640 comprises guide structures 646 structured to engage counterpart guide structures 686 in the form of holes in PCB 680. Guide structures 646 engage counterpart guide structures 686 to provide a first degree of alignment between housing 640 and PCB 680. The guides engage socket 660 to provide a second degree of alignment between the first plurality of contacts and a second plurality of contacts 682, 682' provided on a surface of PCB 680. As in the embodiment of FIG. 4, contacts 682, 682' are grouped into two sets of contacts. Contacts 682 are arranged in a first row 683 of parallel contacts, and contacts 682' are arranged in a second row 683' of parallel contacts. Rows 683 and 683 are parallel.

The cables 650, 650' are likewise grouped into two sets of cables that pair with the contacts of the respective two rows.

Figure 7A:
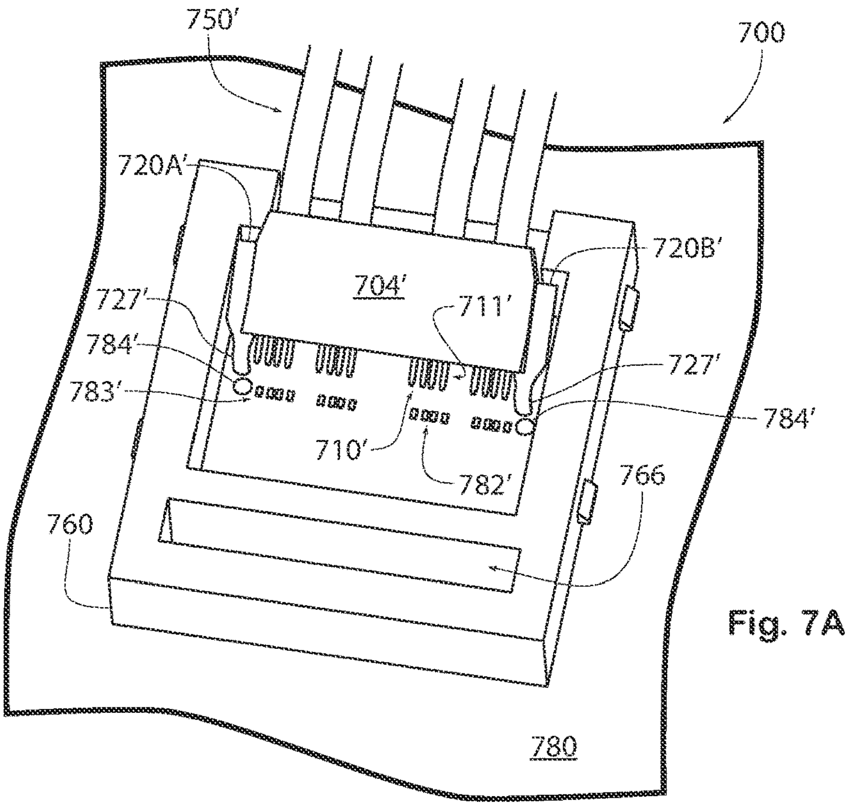
FIGS. 7A to 7C show a seventh embodiment of an assembly in accordance with the present disclosure.
Figure 7B:
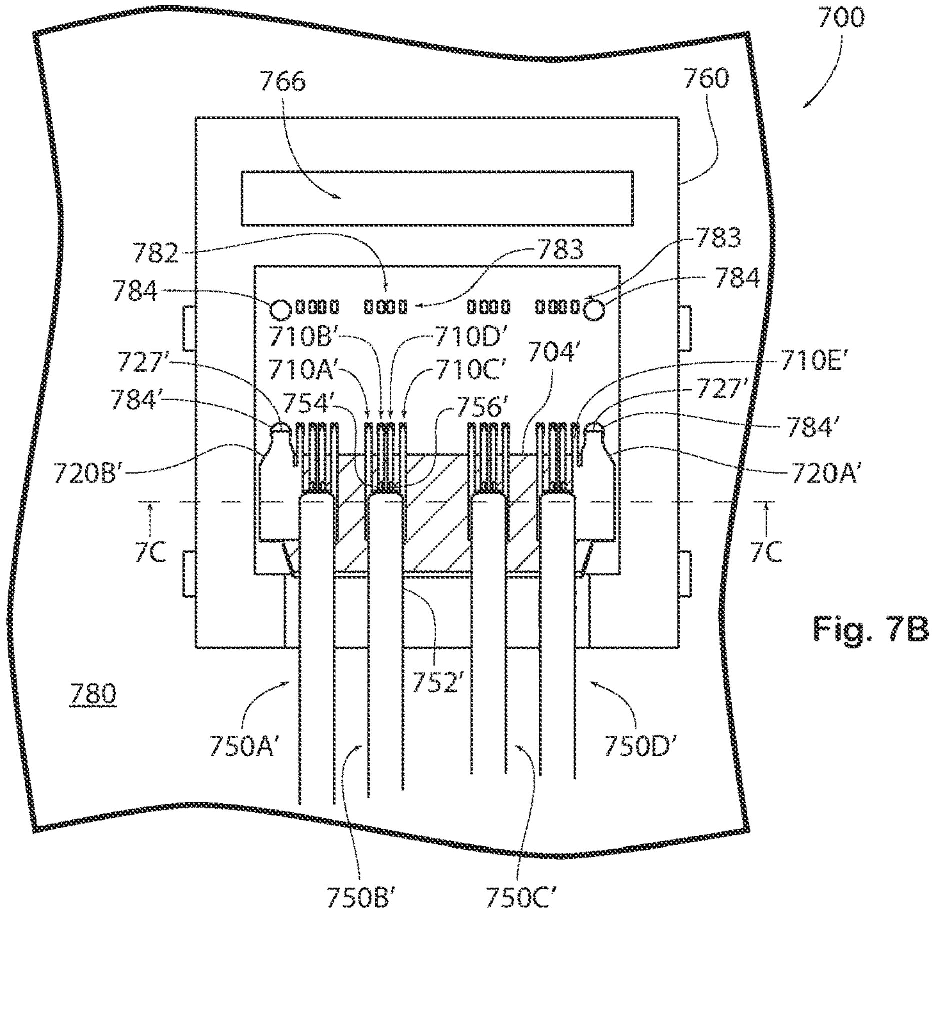
Figure 7C:
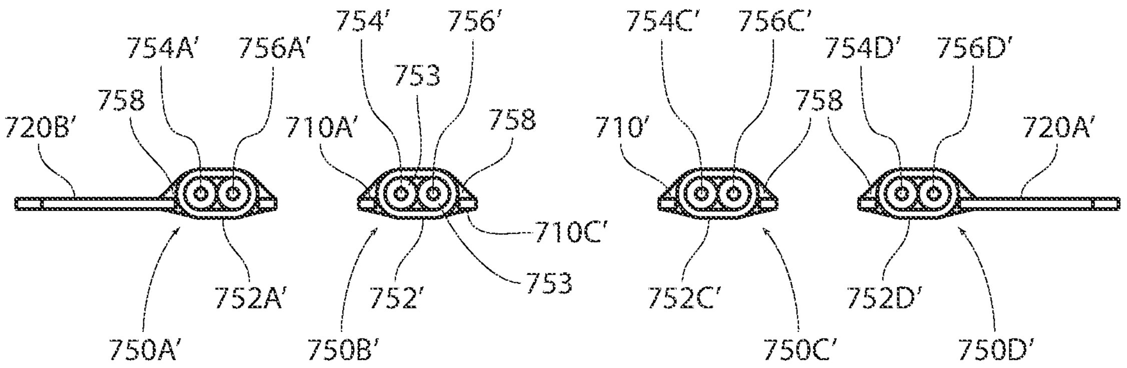

FIGS. 7A to 7C show, in schematic representation, a seventh embodiment of an assembly 700 in accordance with the present disclosure, e.g. as described above.

In the embodiment illustrated in FIGS. 7A to 7C, assembly 700 comprises a first plurality of contacts 710', a plurality of guides 720A', 720B', a plurality of twin-axial cables 750', and a guiding component in the form of a printed circuit board (PCB) 780 and a socket 760 mounted on PCB 780. Socket 760 comprises a counterpart guide structure 766 structured to engage, in other embodiments comprising a housing, a guide structure of the housing to provide a first degree of alignment between the housing and the socket. Contacts 710' (four of which are designated individually as 710A' to 710D' in FIG. 7B) are arranged in a row 711' of parallel contacts and are rigidly affixed to guides 720A', 720B' by a block of non-conductive material 704'. As in the embodiment of FIG. 4, printed circuit board 780 comprises a second plurality of contacts 782, 782' that are grouped into two sets of contacts. The sixteen contacts 782 of a first set are arranged in a first row 783 of parallel contacts, and the sixteen contacts 782' of a second set are arranged in a second row 783' of parallel contacts. Row 783 is parallel to row 783'. Guides 720A', 720B' comprise pin-shaped engagement structures 727', and PCB 780 comprises counterpart engagement structures 784, 784' in the form of holes. Contacts 782' of the second plurality are arranged to individually contact respective contacts 710' of the first plurality in the fully engaged state of engagement structures 727' and counterpart engagement structures 784' depicted in FIG. 7B. Engagement of engagement structures 727' and counterpart engagement structures 784' provides a second degree of alignment and delimits a range of motion of contacts 710' relative to contacts 782' in a direction parallel to a common layer of the guides and contacts and perpendicular to a longitudinal axis of an individual one of the contacts. Although the depicted embodiment comprises two guides 720A', 720B', one such guide would suffice to provide the second degree of alignment and delimit a range of motion of contacts 710' relative to contacts 782' in a direction parallel to a common layer of the guides and contacts and perpendicular to a longitudinal axis of an individual one of the contacts.

In FIG. 7B, the block of non-conductive material 704' is depicted in a cut-away cross-section to reveal further details of contacts 710', guides 720A', 720B' and cables 750'. As schematically depicted in FIG. 78, guide 720A' and contact 710E' constitute a unitary element, and the conductors of twin-axial cables 750' (designated individually as 750A' to 750D' in FIG. 7B) are connected to contacts 710' in an interior of the second block of non-conductive material 704'. Inter alia, a reference conductor 752' of twin-axial cable 750B' electrically contacts a first contact 710A' and a third contact 710C', a first signal conductor 754' of twin-axial cable 750B' electrically contacts a second contact 710B', and a second signal conductor 756' of twin-axial cable 750B' electrically contacts a fourth contact 710D'. Third contact 710C' and fourth contact 710D' are situated intermediate first contact 710A' and third contact 710C'.

FIG. 7C schematically depicts a simplified cross-section along line 7C in FIG. 7B. As depicted in FIG. 7C, guide 720B' is soldered by solder 758 to a reference conductor 752A' that shields two signal conductors 754A' and 756A'. Reference conductor 752A' and signal conductors 754A', 756A' form part of twin-axial cable 750A'. Each of contacts 710A' and 710C' are soldered by solder 758 to reference conductor 752' that shields signal conductors 754' and 756'. Two contacts 710' are soldered by solder 758 to a reference conductor 752C' that shields two signal conductors 754C' and 756C'. Reference conductor 752C' and signal conductors 754C', 756C' form part of twin-axial cable 750C'. Guide 720A' is soldered by solder 758 to a reference conductor 752D' that shields two signal conductors 754D' and 756D'. Reference conductor 752D' and signal conductors 754D', 756D' form part of twin-axial cable 750D'.

Figure 8:
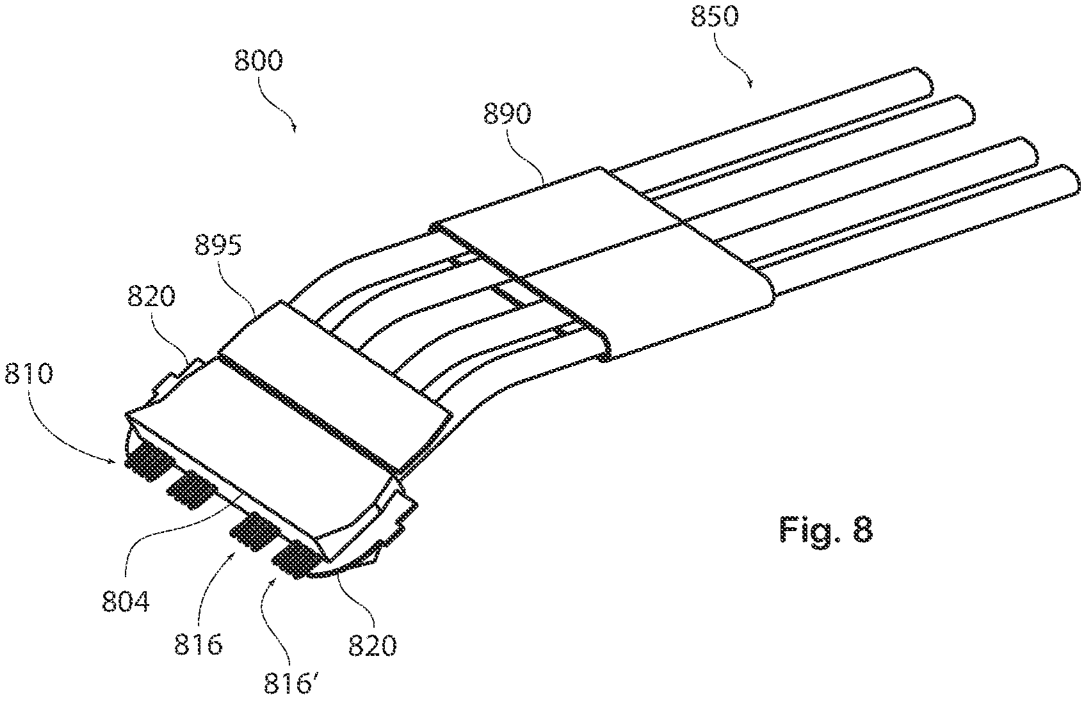
FIG. 8 shows an eighth embodiment of an assembly in accordance with the present disclosure.

FIG. 8 shows, in schematic representation, an eighth embodiment of an assembly in accordance with the present disclosure, e.g. as described above.

In the embodiment illustrated in FIG. 8, assembly 800 comprises a plurality of contacts 810, a plurality of guides 820, a plurality of cables 850, a cable clip 890 that provides strain relief, and a stiffener 895. Contacts 810 are arranged in a row of parallel contacts and are rigidly affixed to guides 820 by a block of non-conductive material 804. Contacts 810 are moreover arranged in clusters 816, 816' of four contacts, where a minimum distance between cluster 816 and neighboring cluster 816' is at least four times a minimum distance between any two contacts of cluster 816 and at least four times a minimum distance between any two contacts of cluster 816'.

Figure 9A:
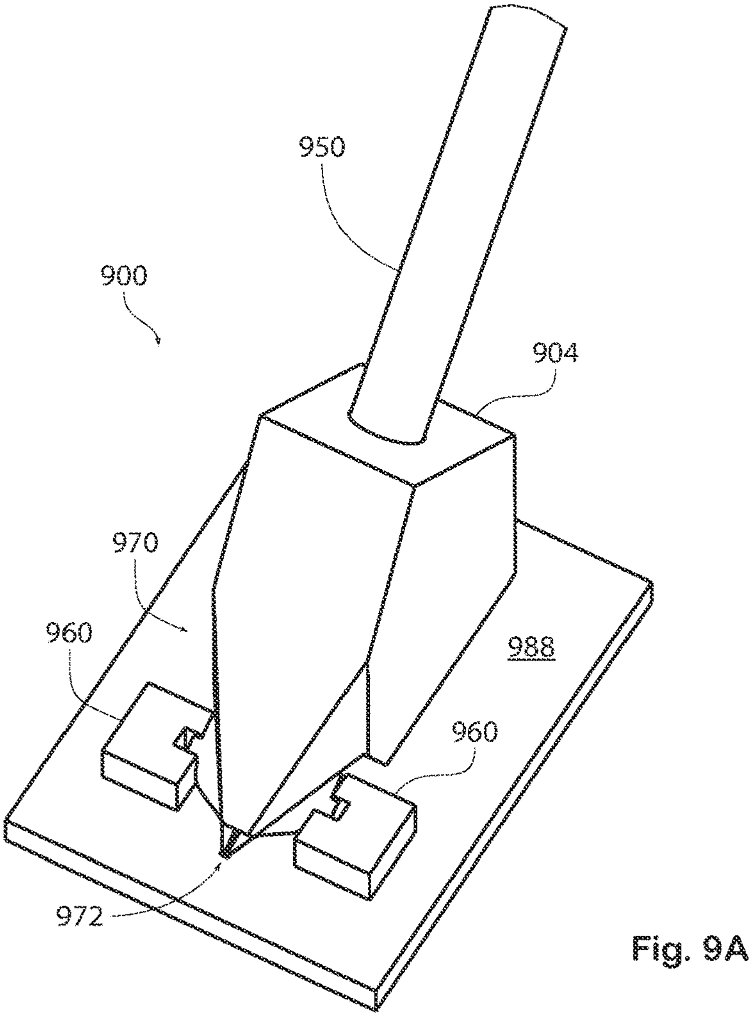
FIGS. 9A and 9B show a ninth embodiment of an assembly in accordance with the present disclosure.
Figure 9B:
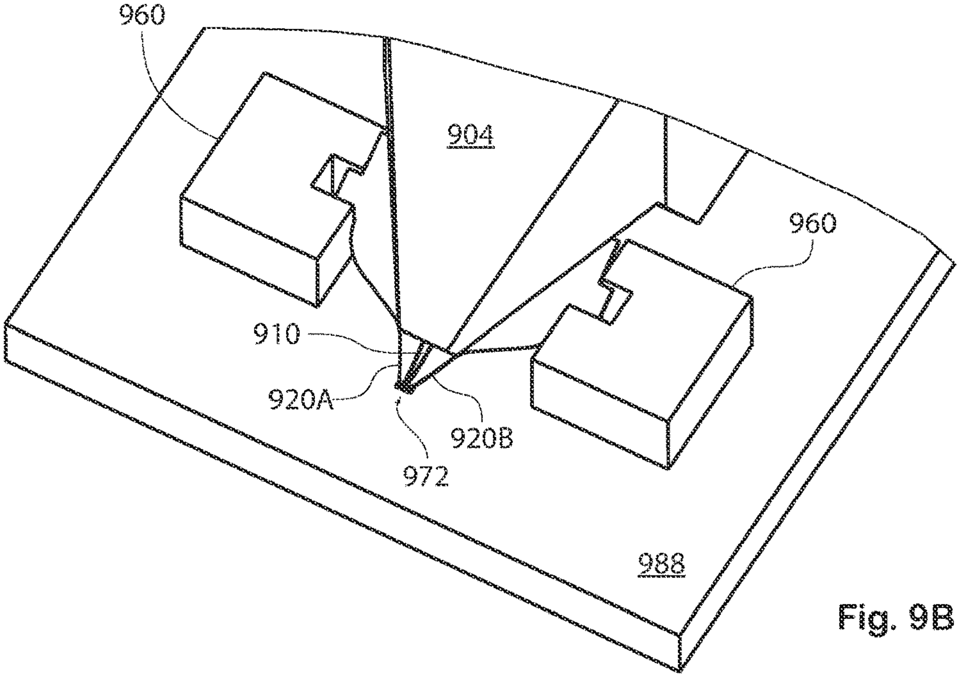

FIGS. 9A and 9B show, in schematic representation, a ninth embodiment of an assembly in accordance with the present disclosure, e.g. as described above.

In the embodiment illustrated in FIGS. 9A and 9B, assembly 900 comprises a first contact 910, a first guide 920A, a second guide 920B, and a cable 950. First contact 910 is rigidly affixed to first guide 920A, second guide 920B, and cable 950 by a block of non-conductive material 904. First contact 910, first guide 920A, second guide 920B, cable 950, and the block of non-conductive material 904 constitute a probe 970 having a tip 972 at a respective tip of each of first contact 910, first guide 920A, second guide 920B. In the illustrated use scenario, first guide 920A and second guide 920B are received by a socket 960 mounted on a surface of a die 988 of an integrated circuit.

In the present disclosure, the verb "may" is used to designate optionality/noncompulsoriness. In other words, something that "may" can, but need not. In the present disclosure, the verb "comprise" may be understood in the sense of including. Accordingly, the verb "comprise" does not exclude the presence of other elements/actions. In the present disclosure, relational terms such as "first," "second," "top," "bottom" and the like may be used solely to distinguish one entity or action from another entity or action without necessarily requiring or implying any actual such relationship or order between such entities or actions.

In the present disclosure, the term "any" may be understood as designating any number of the respective elements, e.g. as designating one, at least one, at least two, each or all of the respective elements. Similarly, the term "any" may be understood as designating any collection(s) of the respective elements, e.g. as designating one or more collections of the respective elements, wherein a (respective) collection may comprise one, at least one, at least two, each or all of the respective elements. The respective collections need not comprise the same number of elements.

In the present disclosure, the expression "at least one" is used to designate any (integer) number or range of (integer) numbers (that is technically reasonable in the given context). As such, the expression "at least one" may, inter alia, be understood as one, two, three, four, five, ten, fifteen, twenty or one hundred. Similarly, the expression "at least one" may, inter alia, be understood as "one or more," "two or more" or "five or more."

In the present disclosure, expressions in parentheses may be understood as being optional. As used in the present disclosure, quotation marks may emphasize that the expression in quotation marks may also be understood in a figurative sense. As used in the present disclosure, quotation marks may identify a particular expression under discussion.

In the present disclosure, many features are described as being optional, e.g. through the use of the verb "may" or the use of parentheses. For the sake of brevity and legibility, the present disclosure does not explicitly recite each and every combination and/or permutation that may be obtained by choosing from the set of optional features. However, the present disclosure is to be interpreted as explicitly disclosing all such combinations/permutations. For example, a system described as having three optional features may be embodied in seven different ways, namely with just one of the three possible features, with any two of the three possible features or with all three of the three possible features.

While various embodiments of the present invention have been disclosed and described in detail herein, it will be apparent to those skilled in the art that various changes may be made to the configuration, operation and form of the invention without departing from the spirit and scope thereof. In particular, it is noted that the respective features of the invention, even those disclosed solely in combination with other features of the invention, may be combined in any configuration excepting those readily apparent to the person skilled in the art as nonsensical. Likewise, use of the singular and plural is solely for the sake of illustration and is not to be interpreted as limiting. Except where the contrary is explicitly noted, the plural may be replaced by the singular and vice-versa.

The invention claimed is:

1. An assembly comprising:
a plurality of contacts; and
at least one guide, wherein
said plurality of contacts comprises a first contact and a second contact,
said second contact is electrically insulated from said first contact,
said at least one guide and each contact of said plurality of contacts comprises a portion belonging to a common layer of metal,
each contact of said plurality of contacts is rigidly affixed to said at least one guide, and
in an unbent state of said at least one guide and said plurality of contacts, a thickness of said at least one guide as measured from an exposed first major surface of said at least one guide to an exposed second major surface of said at least one guide is less than 120% of a thickness of said plurality of contacts as measured in a direction perpendicular to said first major surface.

2. The assembly of claim 1, wherein:
said plurality of contacts and said at least one guide are elements selected from the group consisting of:
elements cut from a single sheet of metal,
elements cut from a layered stack of materials, at least one of which is a conductive material,
elements etched from a unitary layer of metal,
elements etched from a layered stack of materials, at least one of which is a conductive material, and
elements formed by depositing at least one layer of material onto areas of a surface, which areas correspond to a shape of said first plurality of contacts and said at least one guide, and which at least one layer of material comprises a layer of conductive material.

3. The assembly of claim 1, wherein:
a distance from a central longitudinal axis of a minimally sized imaginary rectangular cuboid enclosing said first contact to a central longitudinal axis of a minimally sized imaginary rectangular cuboid enclosing said second contact is less than a distance selected from the group consisting of 0.5 mm, 0.2 mm, 0.1 mm, 0.05 m and 0.02 mm.

4. The assembly of claim 1, comprising:
a reference conductor; and
a signal conductor, wherein
said plurality of contacts comprises a third contact,
said second contact is situated intermediate said first contact and said third contact,
said second contact is electrically insulated from said third contact,
said reference conductor electromagnetically shields a portion of a length of said signal conductor,
said signal conductor is electrically insulated from said reference conductor,
said reference conductor electrically contacts at least one of said first contact and
said third contact, and
said signal conductor electrically contacts said second contact.

5. The assembly of claim 1, wherein:
said at least one guide is shaped to engage a component such that a position of said plurality of contacts relative to said component is delimited in a direction parallel to said common layer and perpendicular to a longitudinal axis of at least one contact belonging to said plurality of contacts.

6. The assembly of claim 5, wherein comprising:
a plurality of contact pads in planar arrangement on a third surface, wherein
each individual contact of said plurality of contacts is shaped to respectively contact one individual contact pad of said plurality of contact pads, and
said component is selected from the group consisting of:
a socket mounted on said third surface,
a printed circuit board comprising said third surface, and
a package substrate of a package, which package substrate comprises said third surface.

7. The assembly of claim 1, comprising:
a plurality of contact pads in planar arrangement on a surface, wherein
each individual contact of said plurality of contacts is shaped to respectively contact one individual contact pad of said plurality of contact pads.

8. A probe comprising:
a first guide,
a second guide, and
a first contact intermediate said first guide and said second guide, wherein
said first contact is electrically insulated from said first guide and said second guide,
said probe comprises not more than two contacts intermediate said first guide and said second guide,
each of said first guide, said second guide, and said first contact comprises a portion belonging to a common layer of metal, and
said first contact is rigidly affixed to said first guide and said second guide.

9. The probe of claim 8, wherein:
said first guide, said second guide, and said first contact are elements selected from the group consisting of:
elements cut from a single sheet of metal,
elements cut from a layered stack of materials, at least one of which is a conductive material,
elements etched from a unitary layer of metal,
elements etched from a layered stack of materials, at least one of which is a conductive material, and
elements formed by depositing at least one layer of material onto areas of a surface, which areas correspond to a shape of said first contact, said first guide, and said second guide, and which at least one layer of material comprises a layer of conductive material.

10. The probe of claim 8, comprising:
a second contact intermediate said first guide and said second guide, wherein
said second contact comprises a portion belonging to said common layer of metal, and
said second contact is rigidly affixed to said first contact, said first guide, and said second guide.

11. The probe of claim 10, wherein:
a distance from a central longitudinal axis of a minimally sized imaginary rectangular cuboid enclosing said first contact to a central longitudinal axis of a minimally sized imaginary rectangular cuboid enclosing said second contact is less than a distance selected from the group consisting of 0.5 mm, 0.2 mm, and 0.1 mm, 0.05 m and 0.02 mm.

12. An assembly comprising:
a stack of layered materials, wherein
said stack of layered materials is structured into a plurality of disjointed units,
each unit of said plurality of disjointed units comprises a volume of each layered material of the stack,
said plurality of disjointed units constitutes a plurality of contacts and at least one guide,
said at least one guide and each contact of said plurality of contacts comprises a portion belonging to a common layer of metal, and
each contact of said plurality of contacts is rigidly affixed to said at least one guide.

13. The assembly of claim 12, comprising:
a block of non-conductive material, wherein
each contact of said plurality of contacts is partially embedded in and protrudes from said block of non-conductive material.

14. The assembly of claim 12, wherein:
said plurality of contacts comprises a first contact and a second contact, and
a distance from a central longitudinal axis of a minimally sized imaginary rectangular cuboid enclosing said first contact to a central longitudinal axis of a minimally sized imaginary rectangular cuboid enclosing said second contact is less than a distance selected from the group consisting of 0.5 mm, 0.2 mm, 0.1 mm, 0.05 m and 0.02 mm.

15. The assembly of claim 12, comprising:
a reference conductor; and
a signal conductor, wherein
said plurality of contacts comprises a first contact, a second contact and a third contact,
said second contact is situated intermediate said first contact and said third contact,
said second contact is electrically insulated from said first contact and said third contact,
said reference conductor electromagnetically shields a portion of a length of said signal conductor,
said signal conductor is electrically insulated from said reference conductor,
said reference conductor electrically contacts at least one of said first contact and
said third contact, and
said signal conductor electrically contacts said second contact.

16. The assembly of claim 12, comprising:
a component, wherein
at least one of said component and said at least one guide comprises a taper structured to restrict an engagement motion of said at least one guide relative to said component to an increasingly narrower range as a degree of engagement of said at least one guide relative to said component increases.

17. An assembly comprising:
a connector; and
a component, wherein
said connector comprises:
a housing;
a plurality of contacts; and
at least one guide,
said at least one guide and each contact of said plurality of contacts comprises a portion belonging to a common layer of metal,
each contact of said plurality of contacts is rigidly affixed to said at least one guide, and
said at least one guide and said housing are structured to engage said component such that engagement of said at least one guide and said component provides a significantly more accurate degree of alignment than engagement of said housing and said component.

18. The assembly of claim 17, wherein:
said plurality of contacts and said at least one guide are elastically supported relative to said housing.

19. The assembly of claim 17, wherein:
said plurality of contacts comprises a first contact and a second contact, and
a distance from a central longitudinal axis of a minimally sized imaginary rectangular cuboid enclosing said first contact to a central longitudinal axis of a minimally sized imaginary rectangular cuboid enclosing said second contact is less than a distance selected from the group consisting of 0.5 mm, 0.2 mm, 0.1 mm, 0.05 m and 0.02 mm.

* * * * *